US012209646B2

(12) United States Patent
Zhu et al.

(10) Patent No.: US 12,209,646 B2
(45) Date of Patent: Jan. 28, 2025

(54) HYBRID TRANSMISSION DEVICE WITH MECHANICAL CONTINUOUSLY VARIABLE TRANSMISSION AND CONTROL METHOD THEREOF

(71) Applicant: JIANGSU UNIVERSITY, Zhenjiang (CN)

(72) Inventors: Zhen Zhu, Zhenjiang (CN); Yihan Zhang, Zhenjiang (CN); Yingfeng Cai, Zhenjiang (CN); Long Chen, Zhenjiang (CN); Xiaodong Sun, Zhenjiang (CN); Changgao Xia, Zhenjiang (CN); Xiang Tian, Zhenjiang (CN); Jie Sheng, Zhenjiang (CN); Rui Hou, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 18/023,742

(22) PCT Filed: Feb. 23, 2022

(86) PCT No.: PCT/CN2022/077356
§ 371 (c)(1),
(2) Date: Feb. 28, 2023

(87) PCT Pub. No.: WO2023/151124
PCT Pub. Date: Aug. 17, 2023

(65) Prior Publication Data
US 2024/0288055 A1  Aug. 29, 2024

(30) Foreign Application Priority Data
Feb. 11, 2022 (CN) .......................... 202210129054.2

(51) Int. Cl.
F16H 47/04 (2006.01)
F16H 3/62 (2006.01)
(Continued)

(52) U.S. Cl.
CPC ............. F16H 47/04 (2013.01); F16H 61/66 (2013.01); F16H 2200/2007 (2013.01); F16H 2200/2048 (2013.01)

(58) Field of Classification Search
CPC .. F16H 37/084–2037/0893; F16H 2200/2007; F16H 3/62–66; F16H 47/04; F16H 2200/2048; F16H 61/009
See application file for complete search history.

(56) References Cited
U.S. PATENT DOCUMENTS
10,955,038 B1* 3/2021 Zhu .......................... F16H 47/04
11,072,231 B1* 7/2021 Zhu .......................... F16H 47/04
(Continued)

FOREIGN PATENT DOCUMENTS
CN 109723789 A 5/2019
CN 112128337 A 12/2020
(Continued)

OTHER PUBLICATIONS
Raw translation of "CN112128337A", Zhu, Gear-double-ring-hydraulic composite transmission device, Dec. 25, 2020, 44pages (Year: 2020).*

Primary Examiner — Ernesto A Suarez
Assistant Examiner — Lillian T Nguyen
(74) Attorney, Agent, or Firm — Bayramoglu Law Offices LLC

(57) ABSTRACT
A hybrid transmission device with a mechanical continuously variable transmission and a control method thereof are provided. The device includes an input shaft assembly, a front planetary gear transmission assembly, a rear planetary
(Continued)

gear transmission assembly, an output shaft, and a mechanical continuously variable transmission. Single transmission modes and hybrid transmission modes are implemented through combination and engagement/disengagement of brakes and clutches. The device and the method realize free switching among various transmission modes and integrates the single transmission modes and the hybrid transmission modes, thereby increasing the degree of freedom in adjustment and expanding the speed regulation range. Input and output shafts of a front cup wheel and ring disc transmission mechanism and a rear cup wheel and ring disc transmission mechanism are coaxial, so that the structure is compact and intermediate rollers can stably and reliably transmit large torque.

13 Claims, 11 Drawing Sheets

(51) Int. Cl.
  *F16H 37/08* (2006.01)
  *F16H 61/66* (2006.01)

(56) References Cited

U.S. PATENT DOCUMENTS

2016/0109001 A1\* 4/2016 Schoolcraft ........... F16H 37/022
                                                          475/214
2021/0372512 A1   12/2021 Zhu et al.

FOREIGN PATENT DOCUMENTS

| CN | 113389869 A | 9/2021 |
| CN | 114001139 A | 2/2022 |
| CN | 114017484 A | 2/2022 |
| JP | 2008069834 A | 3/2008 |

\* cited by examiner

HYBRID TRANSMISSION DEVICE WITH MECHANICAL CONTINUOUSLY VARIABLE TRANSMISSION AND CONTROL METHOD THEREOF

CROSS REFERENCE TO THE RELATED APPLICATIONS

This application is the national phase entry of International Application No. PCT/CN2022/077356, filed on Feb. 23, 2022, which is based upon and claims priority to Chinese Patent Application No. 202210129054.2, filed on Feb. 11, 2022, the entire contents of which are incorporated herein by reference.

TECHNICAL FIELD

The present disclosure relates to a hybrid transmission device, and in particular, to a hybrid transmission device with a mechanical continuously variable transmission and a control method thereof, which belong to the technical field of variable transmission devices.

BACKGROUND

The gear single-flow transmission has high efficiency, but the transmission ratio is fixed and frequent shifts are required during operation. The hydraulic single-flow transmission can easily realize stepless speed regulation and enables high torque transmission, but the transmission efficiency is low.

According to the structure of a two-stage cup wheel and ring disc mechanical continuously variable transmission device, input and output discs on two sides are compressed by springs and an input and output transmission ratio is changed by varying the angle of intermediate rollers. Taking the Japanese Nissan Extroid CVT as a typical example, the intermediate rollers are hydraulically driven under electric control, the principle of traction drive is adopted for transmission, the intermediate rollers do not directly contact the input and output discs, and torque is transmitted through special viscous oil, thereby reducing harmful friction and wear. Besides, input and output shafts of the two-stage cup wheel and ring disc mechanical continuously variable transmission device are coaxial, so that the structure is compact and the intermediate rollers can transmit large torque. The two-stage cup wheel and ring disc mechanical continuously variable transmission device has a wide speed regulation range and a wide applicable power range, but has low efficiency at a large transmission ratio.

Hybrid transmissions can carry forward the advantages and abandon the disadvantages of the single-flow transmissions, and become the development trend of variable transmission devices. A transmission device that integrates multiple transmission modes and can implement hybrid transmissions by freely combining the transmission modes will be a new trend in the design of the variable transmission devices.

SUMMARY

To eliminate the defects in the prior art, the present disclosure provides a hybrid transmission device with a two-stage cup wheel and ring disc mechanical continuously variable transmission and a control method thereof. The hybrid transmission device integrates single transmission modes and hybrid transmission modes and can switch among the various transmission modes, thereby increasing the degree of freedom in adjustment and expanding the speed regulation range.

Technical solutions: A hybrid transmission device with a mechanical continuously variable transmission is provided, which includes:
  an input shaft assembly, where the input shaft assembly includes an input shaft, a first clutch $L_1$, an intermediate gear, and a transmission shaft;
  a hydraulic transmission assembly, where the hydraulic transmission assembly includes a variable displacement pump, a fixed displacement motor, a second clutch $L_2$, and a variable displacement pump driving gear pair; the variable displacement pump is connected to the transmission shaft sequentially through the second clutch $L_2$ and the variable displacement pump driving gear pair;
  a front planetary gear transmission assembly, where the front planetary gear transmission assembly includes a front planetary gear outer ring gear, a front planetary gear planet carrier, a front planetary gear sun gear, a third brake $B_3$, and a second brake $B_2$; the third brake $B_3$ is connected to the front planetary gear sun gear, the input shaft is connected to the front planetary gear sun gear through the first clutch $L_1$, the second brake $B_2$ is connected to the front planetary gear outer ring gear, and the front planetary gear outer ring gear is gear-connected to an output end of the fixed displacement motor;
  a rear planetary gear transmission assembly, where the rear planetary gear transmission assembly includes a rear planetary gear outer ring gear, a rear planetary gear planet carrier, a rear planetary gear sun gear, and a first brake $B_1$, the rear planetary gear sun gear is connected to the front planetary gear planet carrier, and the first brake $B_1$ is connected to the rear planetary gear outer ring gear;
  an output shaft, where the output shaft is connected to the rear planetary gear planet carrier;
  a mechanical continuously variable transmission, where the mechanical continuously variable transmission includes a cup wheel and ring disc transmission mechanism, a cup wheel and ring disc input shaft, and a cup wheel and ring disc output shaft; the cup wheel and ring disc input shaft is gear-connected to the transmission shaft and the front planetary gear planet carrier, a third clutch $L_3$ is arranged between the cup wheel and ring disc input shaft and the transmission shaft, a fourth clutch $L_4$ is arranged between the cup wheel and ring disc input shaft and the front planetary gear planet carrier, and the cup wheel and ring disc output shaft is gear-connected to the rear planetary gear outer ring gear.

The present disclosure realizes free switching among various transmission modes and integrates the single transmission modes and the hybrid transmission modes, thereby increasing the degree of freedom in adjustment and expanding the speed regulation range.

Preferably, to further expand the adjustment range of transmission ratios, the cup wheel and ring disc transmission mechanism includes a front cup wheel and ring disc transmission mechanism and a rear cup wheel and ring disc transmission mechanism, where the front cup wheel and ring disc transmission mechanism and the rear cup wheel and ring disc transmission mechanism are connected in series. Input and output shafts of the front cup wheel and ring disc transmission mechanism and the rear cup wheel and ring disc transmission mechanism are coaxial, so that the structure is compact and intermediate rollers can stably and reliably transmit large torque.

A control method of the hybrid transmission device with the mechanical continuously variable transmission is provided, where the single transmission modes and the hybrid transmission modes are implemented through combination and engagement/disengagement of the brakes and the clutches; the single transmission modes include a hydraulic transmission mode, a mechanical constant-speed transmission mode, and a mechanical continuously variable transmission mode; the hybrid transmission modes include a mechanical constant-speed and hydraulic hybrid transmission mode, mechanical constant-speed and mechanical variable-speed hybrid transmission modes, and hydraulic and mechanical variable-speed hybrid transmission modes.

Preferably, the single transmission modes are controlled by the following methods:

in the hydraulic transmission mode, engaging the second clutch $L_2$, the first brake $B_1$, and the third brake $B_3$ while disengaging the first clutch $L_1$, the third clutch $L_3$, the fourth clutch $L_4$, and the second brake $B_2$, so that power passes through the input shaft, the intermediate gear, the transmission shaft, the second clutch $L_2$, and the variable displacement pump driving gear pair to drive the variable displacement pump to work; the variable displacement pump outputs high-pressure oil to drive the fixed displacement motor to rotate; the power output from an output shaft of the fixed displacement motor passes through the front planetary gear outer ring gear, the front planetary gear planet carrier, the rear planetary gear sun gear, and the rear planetary gear planet carrier and is output from the output shaft;

in the mechanical constant-speed transmission mode, engaging the first clutch $L_1$, the first brake $B_1$, and the second brake $B_2$ while disengaging the second clutch $L_2$, the third clutch $L_3$, the fourth clutch $L_4$, and the third brake $B_3$, so that power is input from the input shaft, then sequentially passes through the first clutch $L_1$, the front planetary gear sun gear, the front planetary gear planet carrier, the rear planetary gear sun gear, and the rear planetary gear planet carrier, and is output from the output shaft; and in the mechanical continuously variable transmission mode, engaging the third clutch $L_3$, the second brake $B_2$, and the third brake $B_3$ while disengaging the first clutch $L_1$, the second clutch $L_2$, the fourth clutch $L_4$, and the first brake $B_1$, so that power passes through the input shaft, the intermediate gear, the transmission shaft, the third clutch $L_3$, the cup wheel and ring disc input shaft, the cup wheel and ring disc transmission mechanism, the cup wheel and ring disc output shaft, the rear planetary gear outer ring gear, and the rear planetary gear planet carrier and is output from the output shaft.

Preferably, the hybrid transmission modes are controlled by the following methods:

in the mechanical constant-speed and hydraulic hybrid transmission mode, engaging the first clutch $L_1$, the second clutch $L_2$, and the first brake $B_1$ while disengaging the third clutch $L_3$, the fourth clutch $L_4$, the second brake $B_2$, and the third brake $B_3$, so that power passes through the input shaft assembly and is split into two parts; one part of the power passes through the input shaft, the intermediate gear, the transmission shaft, the second clutch $L_2$, and the variable displacement pump driving gear pair to drive the variable displacement pump to work; the variable displacement pump outputs high-pressure oil to drive the fixed displacement motor to rotate; the power output from the output shaft of the fixed displacement motor passes through the front planetary gear outer ring gear to the front planetary gear planet carrier; the other part of the power is input from the input shaft, then sequentially passes through the first clutch $L_1$ and the front planetary gear sun gear to the front planetary gear planet carrier, and is converged with the power passing through the hydraulic transmission assembly; the power after convergence passes through the rear planetary gear sun gear and the rear planetary gear planet carrier and is output from the output shaft;

the mechanical constant-speed and mechanical variable-speed hybrid transmission modes include a mechanical constant-speed and mechanical variable-speed parallel hybrid transmission mode and a mechanical constant-speed and mechanical variable-speed series hybrid transmission mode, where in the mechanical constant-speed and mechanical variable-speed parallel hybrid transmission mode, power passes through the input shaft assembly and is split into two parts; the two parts of the power respectively pass through the front planetary gear transmission assembly and the mechanical continuously variable transmission connected in parallel and are converged at the rear planetary gear planet carrier of the rear planetary gear transmission assembly, and the power after convergence is output from the output shaft;

in the mechanical constant-speed and mechanical variable-speed series hybrid transmission mode, power sequentially passes through the front planetary gear transmission assembly and the mechanical continuously variable transmission and is converged at the rear planetary gear planet carrier, and the power after convergence is output from the output shaft;

the hydraulic and mechanical variable-speed hybrid transmission modes include a hydraulic and mechanical variable-speed parallel hybrid transmission mode and a hydraulic and mechanical variable-speed series hybrid transmission mode, where in the hydraulic and mechanical variable-speed parallel hybrid transmission mode, power passes through the input shaft, the intermediate gear, and the transmission shaft and is split into two parts: the two parts of the power respectively pass through the hydraulic transmission assembly and the mechanical continuously variable transmission connected in parallel and are converged at the rear planetary gear planet carrier of the rear planetary gear transmission assembly, and the power after convergence is output from the output shaft;

in the hydraulic and mechanical variable-speed series hybrid transmission mode, power sequentially passes through the hydraulic transmission assembly and the mechanical continuously variable transmission and is converged at the rear planetary gear planet carrier, and the power after convergence is output from the output shaft.

Preferably, the mechanical constant-speed and mechanical variable-speed parallel hybrid transmission mode is controlled by the following method:

engaging the first clutch $L_1$, the third clutch $L_3$, and the second brake $B_2$ while disengaging the second clutch $L_2$, the fourth clutch $L_4$, the first brake $B_1$, and the third brake $B_3$, so that power passes through the input shaft assembly and is split into two parts; one part of the power passes through the input shaft, the intermediate gear, the transmission shaft, the third clutch $L_3$, the cup wheel and ring disc input shaft, the cup wheel and ring disc transmission mechanism, the cup wheel and ring disc output shaft, and the rear planetary gear outer ring gear to the rear planetary gear planet carrier; the other part of the power is input from the input shaft, then sequentially passes through the first clutch $L_1$, the front planetary gear sun gear, the front planetary gear planet carrier, and the rear planetary gear sun gear, and is converged at the rear planetary gear planet carrier with the power passing through the mechanical continuously variable transmission; and the power after convergence is output from the output shaft;

the mechanical constant-speed and mechanical variable-speed series hybrid transmission mode is controlled by the following method:

engaging the first clutch $L_1$, the fourth clutch $L_4$, and the second brake $B_2$ while disengaging the second clutch $L_2$, the third clutch $L_3$, the first brake $B_1$, and the third brake $B_3$, so that power passes through the input shaft, the first clutch $L_1$, the front planetary gear sun gear, the front planetary gear planet carrier, and the rear planetary gear sun gear to the rear planetary gear planet carrier; the power passing through the front planetary gear planet carrier further sequentially passes through the fourth clutch $L_4$, the cup wheel and ring disc input shaft, the cup wheel and ring disc transmission mechanism, the cup wheel and ring disc output shaft, and the rear planetary gear outer ring gear to the rear planetary gear planet carrier; the power passing through the front planetary gear transmission assembly and the power passing through the mechanical continuously variable transmission are converged at the rear planetary gear planet carrier and then output from the output shaft.

Preferably, the hydraulic and mechanical variable-speed parallel hybrid transmission mode is controlled by the following method:

engaging the second clutch $L_2$, the fourth clutch $L_4$, and the third brake $B_3$ while disengaging the first clutch $L_1$, the third clutch $L_3$, the first brake $B_1$, and the second brake $B_2$, so that power passes through the input shaft, the intermediate gear, and the transmission shaft and is split into two parts; one part of the power passes through the second clutch $L_2$ and the variable displacement pump driving gear pair to drive the variable displacement pump to work; the variable displacement pump outputs high-pressure oil to drive the fixed displacement motor to rotate; the power output from the output shaft of the fixed displacement motor passes through the front planetary gear outer ring gear, the front planetary gear planet carrier, and the rear planetary gear sun gear to the rear planetary gear planet carrier; the other part of the power passes through the third clutch $L_3$, the cup wheel and ring disc input shaft, the cup wheel and ring disc transmission mechanism, the cup wheel and ring disc output shaft, and the rear planetary gear outer ring gear to the rear planetary gear planet carrier; the power passing through the hydraulic transmission assembly and the power passing through the mechanical continuously variable transmission are converged at the rear planetary gear planet carrier and then output from the output shaft;

the hydraulic and mechanical variable-speed series hybrid transmission mode is controlled by the following method:

engaging the second clutch $L_2$, the third clutch $L_3$, and the third brake $B_3$ while disengaging the first clutch $L_1$, the fourth clutch $L_4$, the first brake $B_1$, and the second brake $B_2$, so that power passes through the input shaft, the intermediate gear, the transmission shaft, the second clutch $L_2$, and the variable displacement pump driving gear pair to drive the variable displacement pump to work; the variable displacement pump outputs high-pressure oil to drive the fixed displacement motor to rotate; the power output from the output shaft of the fixed displacement motor passes through the front planetary gear outer ring gear, the front planetary gear planet carrier, and the rear planetary gear sun gear to the rear planetary gear planet carrier; the power passing through the front planetary gear planet carrier further sequentially passes through the fourth clutch $L_4$, the cup wheel and ring disc input shaft, the cup wheel and ring disc transmission mechanism, the cup wheel and ring disc output shaft, and the rear planetary gear outer ring gear to the rear planetary gear planet carrier; the power passing through the hydraulic transmission assembly and the power passing through the mechanical continuously variable transmission are converged at the rear planetary gear planet carrier and then output from the output shaft.

Preferably, transmission ratios of the single transmission modes are calculated by the following methods:

the transmission ratio $n_0/n_i$ in the hydraulic transmission mode being:

$$\frac{eK_1}{i_1 i_2 i_3 i_4 (1+K_1)(1+K_2)}$$

where $n_0$ is a rotation speed of the output shaft, $n_i$ is a rotation speed of the input shaft, $i_1$ is a transmission ratio of the input shaft and the intermediate gear, $i_2$ is a transmission ratio of the intermediate gear and the transmission shaft, $i_3$ is a transmission ratio of the variable displacement pump driving gear pair, $i_4$ is a transmission ratio of the front planetary gear outer ring gear and the output end of the fixed displacement motor, $K_1$ is a characteristic parameter of the front planetary gear transmission assembly, $K_2$ is a characteristic parameter of the rear planetary gear transmission assembly, and e is a displacement ratio of the hydraulic transmission assembly;

the transmission ratio $n_0/n_i$ in the mechanical constant-speed mode being:

$$\frac{1}{(1+K_1)(1+K_2)}$$

where $n_0$ is the rotation speed of the output shaft, $n_i$ is the rotation speed of the input shaft, $K_1$ is the characteristic parameter of the front planetary gear transmission assembly, and $K_2$ is the characteristic parameter of the rear planetary gear transmission assembly;

the transmission ratio $n_0/n_i$ in the mechanical continuously variable transmission mode being:

$$\frac{K_2}{i_1 i_2 i_5 i_7 (1 + K_2)}$$

where $n_0$ is the rotation speed of the output shaft, $n_i$ is the rotation speed of the input shaft, $i_1$ is the transmission ratio of the input shaft and the intermediate gear, $i_2$ is the transmission ratio of the intermediate gear and the transmission shaft, $i_5$ is a transmission ratio of the transmission shaft and the cup wheel and ring disc input shaft, $i_8$ is a transmission ratio of the mechanical continuously variable transmission, $i_7$ is a transmission ratio of the cup wheel and ring disc output shaft and the rear planetary gear outer ring gear, and $K_2$ is the characteristic parameter of the rear planetary gear transmission assembly.

Preferably, transmission ratios of the hybrid transmission modes are calculated by the following methods:

the transmission ratio $n_0/n_i$ in the mechanical constant-speed and hydraulic hybrid transmission mode being:

$$\frac{eK_1 + i_1 i_2 i_3 i_4}{i_1 i_2 i_3 i_4 (1 + K_1)(1 + K_2)}$$

where $n_0$ is the rotation speed of the output shaft, $n_i$ is the rotation speed of the input shaft, $i_1$ is the transmission ratio of the input shaft and the intermediate gear, $i_2$ is the transmission ratio of the intermediate gear and the transmission shaft, $i_3$ is the transmission ratio of the variable displacement pump driving gear pair, $i_4$ is the transmission ratio of the front planetary gear outer ring gear and the output end of the fixed displacement motor, $K_1$ is the characteristic parameter of the front planetary gear transmission assembly, $K_2$ is the characteristic parameter of the rear planetary gear transmission assembly, and e is the displacement ratio of the hydraulic transmission assembly;

the transmission ratio $n_0/n_i$ in the mechanical constant-speed and mechanical variable-speed parallel hybrid transmission mode being:

$$\frac{i_1 i_2 i_5 i_s i_7 + K_2 (1 + K_1)}{i_1 i_2 i_5 i_s i_7 (1 + K_1)(1 + K_2)}$$

where $n_0$ is the rotation speed of the output shaft, $n_i$ is the rotation speed of the input shaft, $i_1$ is the transmission ratio of the input shaft and the intermediate gear, $i_2$ is the transmission ratio of the intermediate gear and the transmission shaft, $i_5$ is the transmission ratio of the transmission shaft and the cup wheel and ring disc input shaft, $i_8$ is the transmission ratio of the mechanical continuously variable transmission, $i_7$ is the transmission ratio of the cup wheel and ring disc output shaft and the rear planetary gear outer ring gear, $K_1$ is the characteristic parameter of the front planetary gear transmission assembly, and $K_2$ is the characteristic parameter of the rear planetary gear transmission assembly;

the transmission ratio $n_0/n_i$ in the mechanical constant-speed and mechanical variable-speed series hybrid transmission mode being:

$$\frac{1 + i_6 i_s i_7}{i_6 i_s i_7 (1 + K_1)(1 + K_2)}$$

where $n_0$ is the rotation speed of the output shaft, $n_i$ is the rotation speed of the input shaft, $i_6$ is a transmission ratio of the front planetary gear planet carrier and the cup wheel and ring disc input shaft, $i_8$ is the transmission ratio of the mechanical continuously variable transmission, $i_7$ is the transmission ratio of the cup wheel and ring disc output shaft and the rear planetary gear outer ring gear, $K_1$ is the characteristic parameter of the front planetary gear transmission assembly, and $K_2$ is the characteristic parameter of the rear planetary gear transmission assembly;

the transmission ratio $n_0/n_i$ in the hydraulic and mechanical variable-speed parallel hybrid transmission mode being:

$$\frac{eK_1(i_4 i_s i_7 + K_2)}{i_1 i_2 i_3 i_4 i_6 i_s i_7 (1 + K_1)(1 + K_2)}$$

where $n_0$ is the rotation speed of the output shaft, $n_i$ is the rotation speed of the input shaft, $i_1$ is the transmission ratio of the input shaft and the intermediate gear, $i_2$ is the transmission ratio of the intermediate gear and the transmission shaft, $i_3$ is the transmission ratio of the variable displacement pump driving gear pair, $i_4$ is the transmission ratio of the front planetary gear outer ring gear and the output end of the fixed displacement motor, $i_6$ is the transmission ratio of the front planetary gear planet carrier and the cup wheel and ring disc input shaft, $i_8$ is the transmission ratio of the mechanical continuously variable transmission, $i_7$ is the transmission ratio of the cup wheel and ring disc output shaft and the rear planetary gear outer ring gear, $K_1$ is the characteristic parameter of the front planetary gear transmission assembly, $K_2$ is the characteristic parameter of the rear planetary gear transmission assembly, and e is the displacement ratio of the hydraulic transmission assembly;

the transmission ratio $n_0/n_i$ in the hydraulic and mechanical variable-speed series hybrid transmission mode being:

$$\frac{ei_5 i_s i_7 K_1 + i_3 i_4 (1 + K_1) K_2}{i_1 i_2 i_3 i_4 i_5 i_s i_7 (1 + K_1)(1 + K_2)}$$

where $n_0$ is the rotation speed of the output shaft, $n_i$ is the rotation speed of the input shaft, $i_1$ is the transmission ratio of the input shaft and the intermediate gear, $i_2$ is the transmission ratio of the intermediate gear and the transmission shaft, $i_2$ is the transmission ratio of the variable displacement pump driving gear pair, $i_4$ is the transmission ratio of the front planetary gear outer ring gear and the output end of the fixed displacement motor, $i_5$ is the transmission ratio of the transmission shaft and the cup wheel and ring disc input shaft, $i_8$ is the transmission ratio of the mechanical continuously variable transmission, $i_7$ is the transmission ratio of the cup wheel and ring disc output shaft and the rear planetary gear outer ring gear, $K_1$ is the characteristic parameter of the front planetary gear transmission assembly, $K_2$ is the characteristic parameter of the rear planetary gear transmission assembly, and e is the displacement ratio of the hydraulic transmission assembly.

Beneficial effects: The present disclosure realizes free switching among various transmission modes and integrates the single transmission modes and the hybrid transmission modes, thereby increasing the degree of freedom in adjustment and expanding the speed regulation range. The input and output shafts of the front cup wheel and ring disc transmission mechanism and the rear cup wheel and ring disc transmission mechanism are coaxial, so that the structure is compact and the intermediate rollers can stably and reliably transmit large torque.

BRIEF DESCRIPTION OF THE DRAWINGS

To illustrate the technical solutions in the embodiments of the present disclosure or in the prior art more clearly, the accompanying drawings required for the description of the embodiments or the prior art are introduced briefly in the following. Apparently, the accompanying drawings in the following description show merely the embodiments of the present disclosure, and persons of ordinary skill in the art can derive other drawings from the accompanying drawings without creative efforts.

DETAILED DESCRIPTION OF THE EMBODIMENTS

The technical solutions of the present disclosure will be clearly and completely described below with reference to the accompanying drawings in the embodiments of the present disclosure. It is obvious that the embodiments to be described are only a part rather than all of the embodiments of the present disclosure. All other embodiments derived by persons of ordinary skill in the art based on the embodiments of the present disclosure without creative efforts shall fall within the protection scope of the present disclosure.

In the description of the present disclosure, it should be understood that terms such as "upper", "lower", "front", "back", "left", "right", "vertical", "horizontal", "top", "bottom", "inner", and "outer" indicate directional or positional relationships based on the accompanying drawings. They are merely used for the convenience and simplicity of the description of the present disclosure, instead of indicating or implying that the demonstrated device or element is located in a specific direction or is constructed and operated in a specific direction. Therefore, they cannot be construed as limitations to the present disclosure.

In the present disclosure, unless otherwise expressly specified and defined, a first feature "on" or "under" a second feature may denote that the first and second features are in direct contact or the first and second features are not in direct contact but through another feature between them. Moreover, the first feature "on", "over", or "above" the second feature denotes that the first feature is directly above or obliquely above the second feature or it simply means that the first feature is at a higher level than the second feature. The first feature "under", "beneath", or "below" the second feature denotes that the first feature is directly below or obliquely below the second feature or it simply means that the first feature is at a lower level than the second feature.

Figure 1:
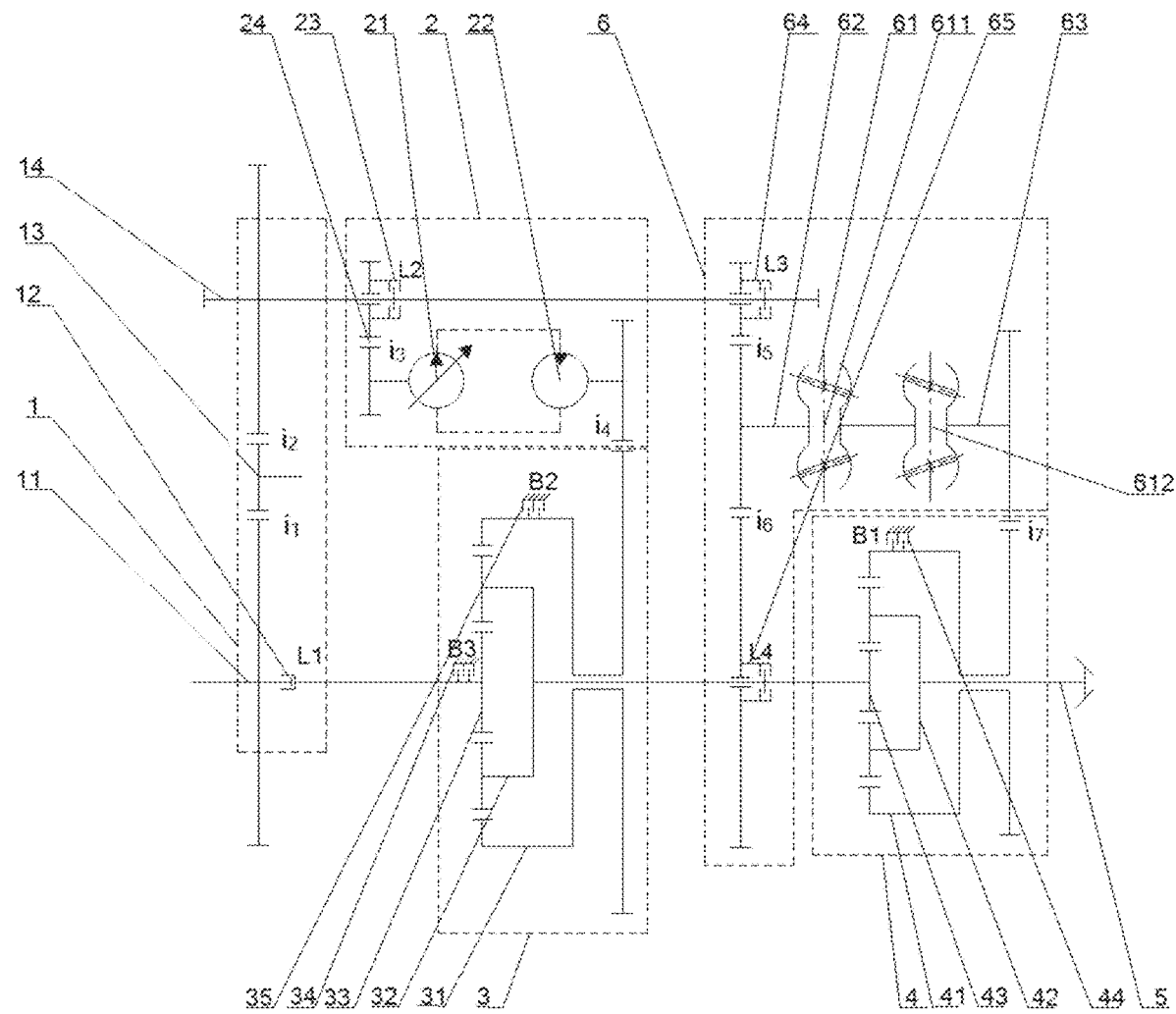
FIG. 1 is a schematic structural diagram of the present disclosure.

As shown in FIG. 1, a hybrid transmission device with a mechanical continuously variable transmission is provided, which includes:
an input shaft assembly 1, where the input shaft assembly 1 includes an input shaft 11, a first clutch $L_1$ 12, an intermediate gear 13, and a transmission shaft 14;
a hydraulic transmission assembly 2, where the hydraulic transmission assembly 2 includes a variable displacement pump 21, a fixed displacement motor 22, a second clutch $L_2$ 23, and a variable displacement pump driving gear pair 24; the variable displacement pump 21 is connected to the transmission shaft 14 sequentially through the second clutch $L_2$ 23 and the variable displacement pump driving gear pair 24;
a front planetary gear transmission assembly 3, where the front planetary gear transmission assembly 3 includes a front planetary gear outer ring gear 31, a front planetary gear planet carrier 32, a front planetary gear sun gear 33, a third brake $B_3$ 34, and a second brake $B_2$ 35; the third brake $B_3$ 34 is connected to the front planetary gear sun gear 33, the input shaft 11 is connected to the front planetary gear sun gear 33 through the first clutch $L_1$ 12, the second brake $B_2$ 35 is connected to the front planetary gear outer ring gear 31, and the front planetary gear outer ring gear 31 is gear-connected to an output end of the fixed displacement motor 22;
a rear planetary gear transmission assembly 4, where the rear planetary gear transmission assembly 4 includes a rear planetary gear outer ring gear 41, a rear planetary gear planet carrier 42, a rear planetary gear sun gear 43, and a first brake $B_1$ 44; the rear planetary gear sun gear 43 is connected to the front planetary gear planet carrier 32, and the first brake $B_1$ 44 is connected to the rear planetary gear outer ring gear 41;
an output shaft 5, where the output shaft 5 is connected to the rear planetary gear planet carrier 42;
a mechanical continuously variable transmission 6, where the mechanical continuously variable transmission 6 includes a cup wheel and ring disc transmission mechanism 61, a cup wheel and ring disc input shaft 62, and a cup wheel and ring disc output shaft 63; the cup wheel and ring disc input shaft 62 is gear-connected to the transmission shaft 14 and the front planetary gear planet carrier 32, a third clutch $L_3$ 64 is arranged between the cup wheel and ring disc input shaft 62 and the transmission shaft 14, a fourth clutch $L_4$ 65 is arranged between the cup wheel and ring disc input shaft 62 and the front planetary gear planet carrier 32, and the cup wheel and ring disc output shaft 63 is gear-connected to the rear planetary gear outer ring gear 41.

The cup wheel and ring disc transmission mechanism 61 includes a front cup wheel and ring disc transmission mechanism 611 and a rear cup wheel and ring disc transmission mechanism 612. The front cup wheel and ring disc transmission mechanism 611 and the rear cup wheel and ring disc transmission mechanism 612 are connected in series.

As shown in Table 1, a control method of the hybrid transmission device with the mechanical continuously variable transmission is provided to implement single transmission modes and hybrid transmission modes through combination and engagement/disengagement of the brakes and the clutches. The single transmission modes include a hydraulic transmission mode, a mechanical constant-speed transmission mode, and a mechanical continuously variable transmission mode. The hybrid transmission modes include a mechanical constant-speed and hydraulic hybrid transmission mode, mechanical constant-speed and mechanical variable-speed hybrid transmission modes, and hydraulic and mechanical variable-speed hybrid transmission modes.

TABLE 1

Engagement state of mode-switching components

| Transmission mode | Clutch state | | | | Brake state | | | Ratio of output speed to input speed |
|---|---|---|---|---|---|---|---|---|
| | $L_1$ | $L_2$ | $L_3$ | $L_4$ | $B_1$ | $B_2$ | $B_3$ | |
| Hydraulic transmission | 0 | 1 | 0 | 0 | 1 | 0 | 1 | $\dfrac{eK_1}{i_1 i_2 i_3 i_4 (1+K_1)(1+K_2)}$ |
| Mechanical constant-speed transmission | 1 | 0 | 0 | 0 | 1 | 1 | 0 | $\dfrac{1}{(1+K_1)(1+K_2)}$ |
| Mechanical continuously variable transmission | 0 | 0 | 1 | 0 | 0 | 1 | 1 | $\dfrac{K_2}{i_1 i_2 i_5 i_s i_7 (1+K_2)}$ |
| Mechanical constant-speed and hydraulic hybrid transmission | 1 | 1 | 0 | 0 | 1 | 0 | 0 | $\dfrac{eK_1 + i_1 i_2 i_3 i_4}{i_1 i_2 i_3 i_4 (1+K_1)(1+K_2)}$ |
| Mechanical constant-speed and mechanical variable-speed parallel hybrid transmission | 1 | 0 | 1 | 0 | 0 | 1 | 0 | $\dfrac{i_1 i_2 i_5 i_s i_7 + K_2(1+K_1)}{i_1 i_2 i_5 i_s i_7 (1+K_1)(1+K_2)}$ |
| Mechanical constant-speed and mechanical variable-speed series hybrid transmission | 1 | 0 | 0 | 1 | 0 | 1 | 0 | $\dfrac{1 + i_6 i_s i_7}{i_6 i_s i_7 (1+K_1)(1+K_2)}$ |
| Hydraulic and mechanical variable-speed parallel hybrid transmission | 0 | 1 | 0 | 1 | 0 | 0 | 1 | $\dfrac{eK_1(i_4 i_s i_7 + K_2)}{i_1 i_2 i_3 i_4 i_6 i_s i_7 (1+K_1)(1+K_2)}$ |
| Hydraulic and mechanical variable-speed series hybrid transmission | 0 | 1 | 1 | 0 | 0 | 0 | 1 | $\dfrac{ei_5 i_s i_7 K_1 + i_3 i_4 (1+K_1)K_2}{i_1 i_2 i_3 i_4 i_5 i_s i_7 (1+K_1)(1+K_2)}$ |

Note: B stands for brake and L stands for clutch; 1 stands for engagement of an execution component and 0 stands for disengagement of an execution component.

Figure 2:
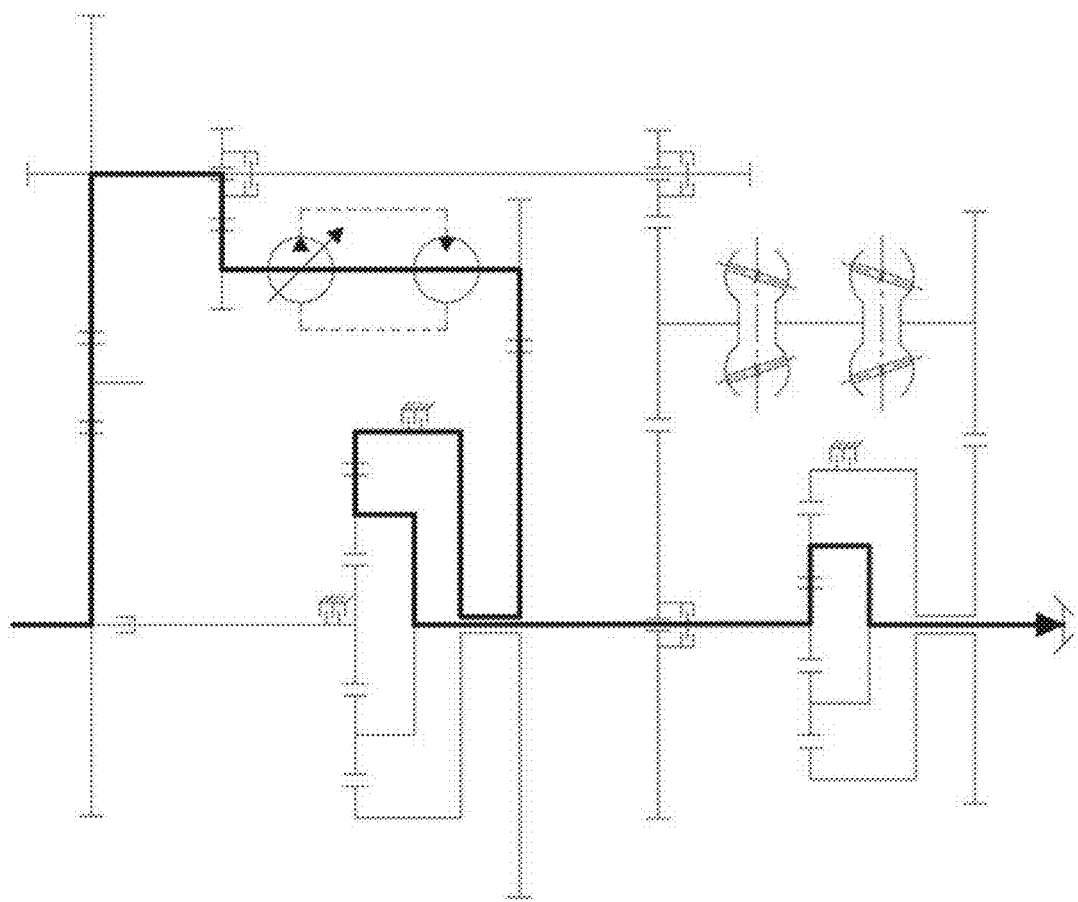
FIG. 2 is a schematic diagram showing the power flow in a hydraulic transmission mode according to the present disclosure.

The single transmission modes are controlled by the following methods:

As shown in FIG. 2, in the hydraulic transmission mode, the second clutch $L_2$ 23, the first brake $B_1$ 44, and the third brake $B_3$ 34 are engaged while the first clutch $L_1$ 12, the third clutch $L_3$ 64, the fourth clutch $L_3$ 65, and the second brake $B_2$ 35 are disengaged. Power passes through the input shaft 11, the intermediate gear 13, the transmission shaft 14, the second clutch $L_2$ 23, and the variable displacement pump driving gear pair 24 to drive the variable displacement pump 21 to work. The variable displacement pump 21 outputs high-pressure oil to drive the fixed displacement motor 22 to rotate. The power output from an output shaft of the fixed displacement motor 22 passes through the front planetary gear outer ring gear 31, the front planetary gear planet carrier 32, the rear planetary gear sun gear 43, and the rear planetary gear planet carrier 42 and is output from the output shaft 5.

The transmission ratio $n_o/n_i$ in the hydraulic transmission mode is:

$$\frac{eK_1}{i_1 i_2 i_3 i_4 (1+K_1)(1+K_2)}$$

where $n_0$ is a rotation speed of the output shaft 5, $n_i$ is a rotation speed of the input shaft 11, $i_1$ is a transmission ratio of the input shaft 11 and the intermediate gear 13, $i_2$ is a transmission ratio of the intermediate gear 13 and the transmission shaft 14, $i_3$ is a transmission ratio of the variable displacement pump driving gear pair 24, $i_4$ is a transmission ratio of the front planetary gear outer ring gear 31 and the output end of the fixed displacement motor 22, $K_1$ is a characteristic parameter of the front planetary gear transmission assembly 3, $K_2$ is a characteristic parameter of the rear planetary gear transmission assembly 4, and e is a displacement ratio of the hydraulic transmission assembly 2.

Figure 3:
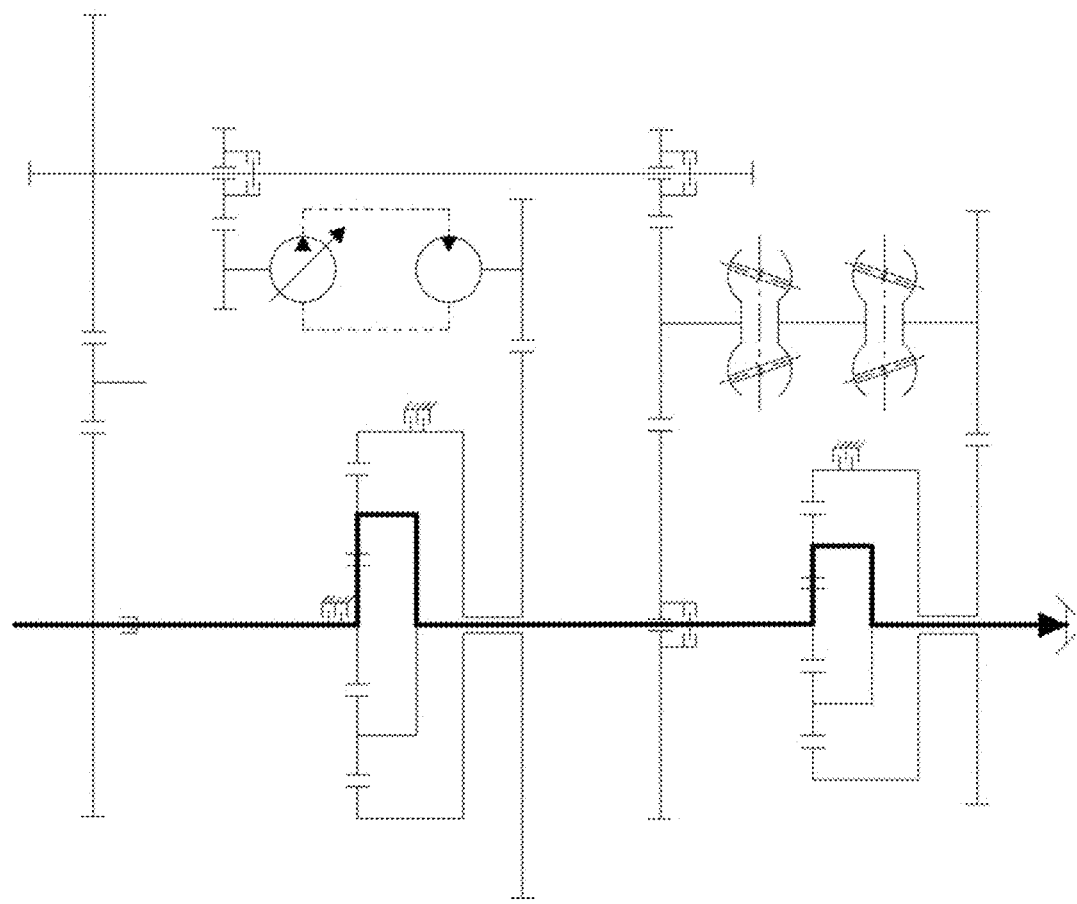
FIG. 3 is a schematic diagram showing the power flow in a mechanical constant-speed transmission mode according to the present disclosure.

As shown in FIG. 3, in the mechanical constant-speed transmission mode, the first clutch $L_1$ 12, the first brake $B_1$ 44, and the second brake $B_2$ 35 are engaged while the second clutch $L_2$ 23, the third clutch $L_3$ 64, the fourth clutch $L_4$ 65, and the third brake $B_3$ 34 are disengaged. Power is input from the input shaft 11, then sequentially passes through the first clutch $L_3$ 12, the front planetary gear sun gear 33, the front planetary gear planet carrier 32, the rear planetary gear sun gear 43, and the rear planetary gear planet carrier 42, and is output from the output shaft 5.

The transmission ratio $n_0/n_i$ in the mechanical constant-speed mode is:

$$\frac{1}{(1+K_1)(1+K_2)}$$

where $n_0$ is the rotation speed of the output shaft 5, $n_i$ is the rotation speed of the input shaft 11, $K_1$ is the characteristic parameter of the front planetary gear transmission assembly 3, and $K_2$ is the characteristic parameter of the rear planetary gear transmission assembly 4.

Figure 4:
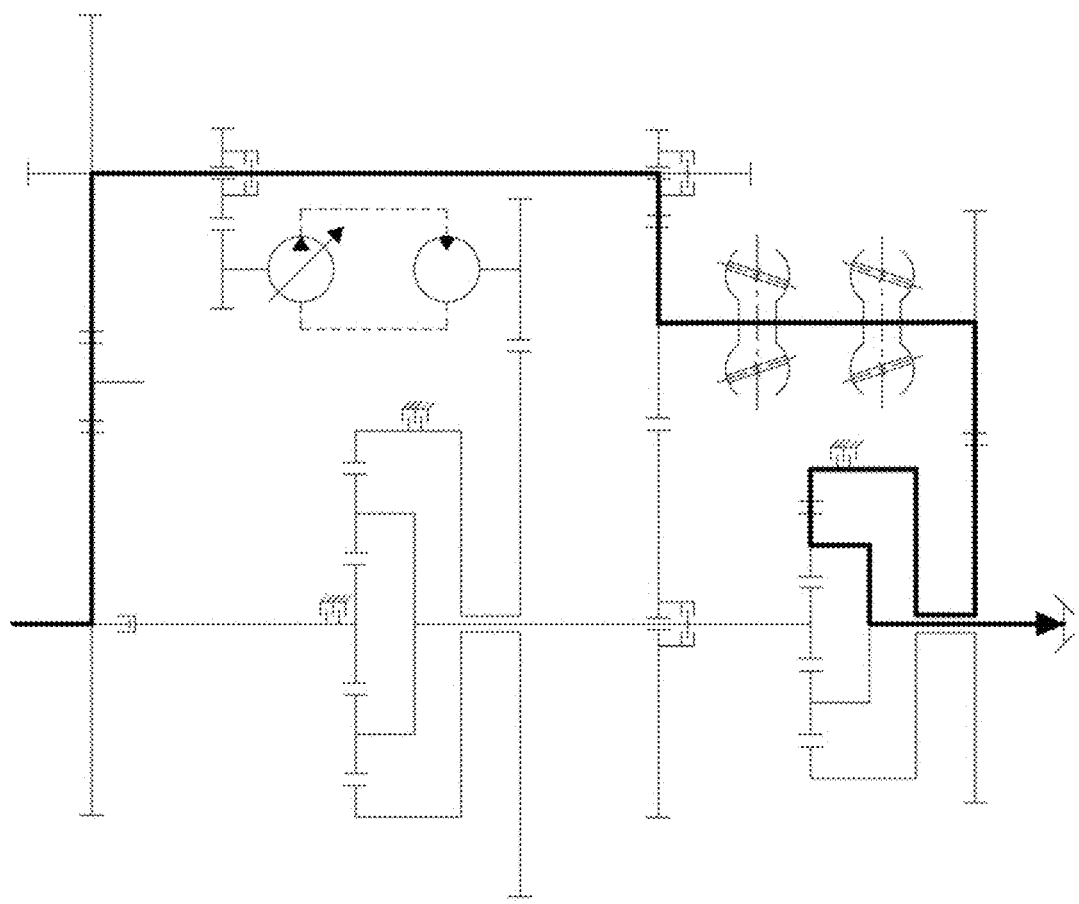
FIG. 4 is a schematic diagram showing the power flow in a mechanical continuously variable transmission mode according to the present disclosure.

As shown in FIG. 4, in the mechanical continuously variable transmission mode, the third clutch $L_3$ 64, the second brake $B_2$ 35, and the third brake $B_3$ 34 are engaged while the first clutch $L_1$ 12, the second clutch $L_2$ 23, the fourth clutch $L_4$ 65, and the first brake $B_1$ 44 are disengaged. Power passes through the input shaft 11, the intermediate gear 13, the transmission shaft 14, the third clutch $L_3$ 64, the cup wheel and ring disc input shaft 62, the cup wheel and ring disc transmission mechanism 61, the cup wheel and ring disc output shaft 63, the rear planetary gear outer ring gear 41, and the rear planetary gear planet carrier 42 and is output from the output shaft 5.

The transmission ratio $n_0/n_i$ in the mechanical continuously variable transmission mode is:

$$\frac{K_2}{i_1 i_2 i_5 i_s i_7 (1+K_2)}$$

where $n_0$ is the rotation speed of the output shaft 5, $n_i$ is the rotation speed of the input shaft 11, $i_1$ is the transmission ratio of the input shaft 11 and the intermediate gear 13, $i_2$ is the transmission ratio of the intermediate gear 13 and the transmission shaft 14, $i_5$ is a transmission ratio of the transmission shaft 14 and the cup wheel and ring disc input shaft 62, $i_8$ is a transmission ratio of the mechanical continuously variable transmission 6, $i_7$ is a transmission ratio of the cup wheel and ring disc output shaft 63 and the rear planetary gear outer ring gear 41, and $K_2$ is the characteristic parameter of the rear planetary gear transmission assembly 4.

Figure 5:
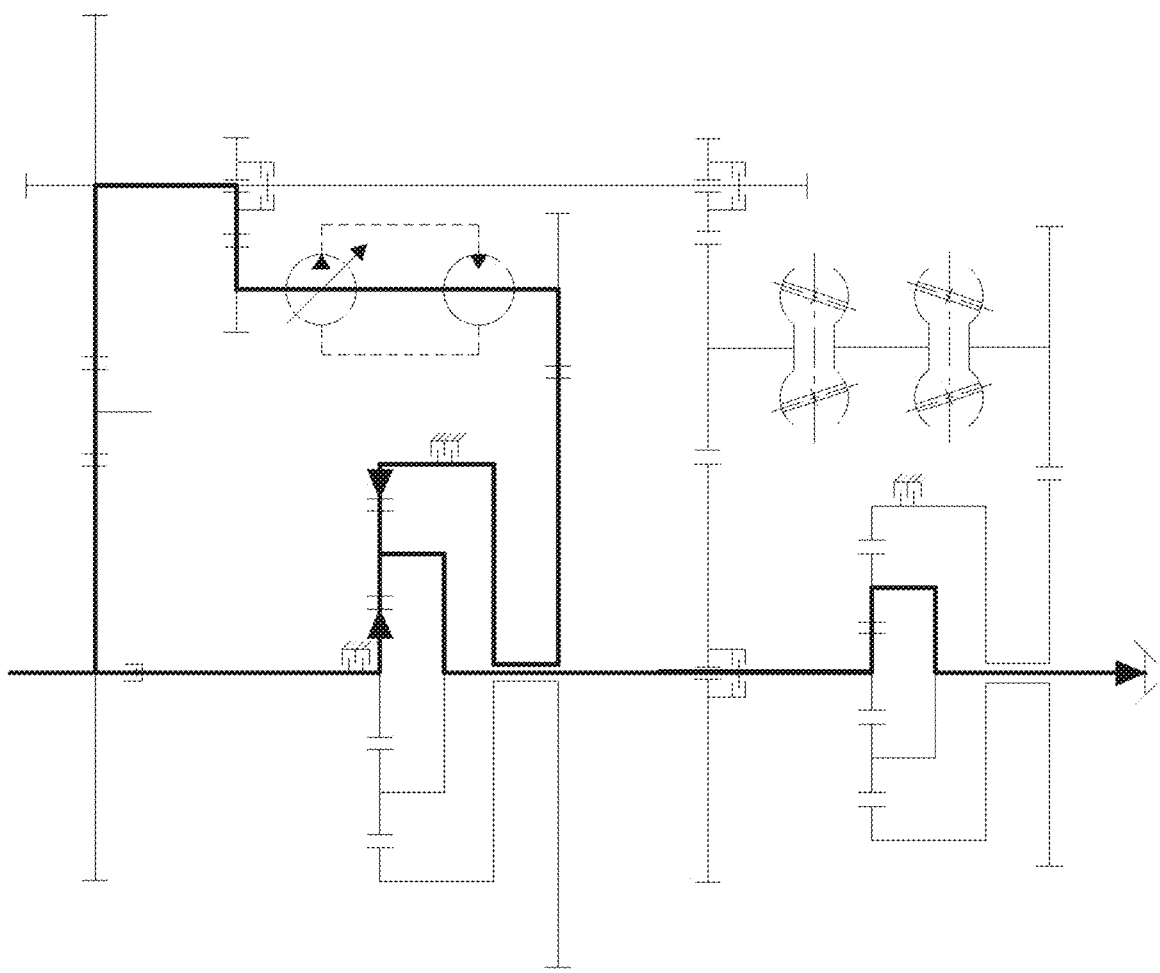
FIG. 5 is a schematic diagram showing the power flow in a mechanical constant-speed and hydraulic hybrid transmission mode according to the present disclosure.

The hybrid transmission modes are controlled by the following methods:

As shown in FIG. 5, in the mechanical constant-speed and hydraulic hybrid transmission mode, the first clutch $L_1$ 12, the second clutch $L_2$ 23, and the first brake $B_1$ 44 are engaged while the third clutch $L_3$ 64, the fourth clutch $L_4$ 65, the second brake $B_2$ 35, and the third brake $B_3$ 34 are disengaged. Power passes through the input shaft assembly 1 and is split into two parts. One part of the power passes through the input shaft 11, the intermediate gear 13, the transmission shaft 14, the second clutch $L_2$ 23, and the variable displacement pump driving gear pair 24 to drive the variable displacement pump 21 to work. The variable displacement pump 21 outputs high-pressure oil to drive the fixed displacement motor 22 to rotate. The power output from the output shaft of the fixed displacement motor 22 passes through the front planetary gear outer ring gear 31 to the front planetary gear planet carrier 32. The other part of the power is input from the input shaft 11, then sequentially passes through the first clutch $L_1$ 12 and the front planetary gear sun gear 33 to the front planetary gear planet carrier 32, and is converged with the power passing through the hydraulic transmission assembly 2. The power after convergence passes through the rear planetary gear sun gear 43 and the rear planetary gear planet carrier 42 and is output from the output shaft 5.

The transmission ratio $n_0/n_i$ in the mechanical constant-speed and hydraulic hybrid transmission mode is:

$$\frac{eK_1 + i_1 i_2 i_3 i_4}{i_1 i_2 i_3 i_4 (1+K_1)(1+K_2)}$$

where $n_0$ is the rotation speed of the output shaft 5, $n_i$ is the rotation speed of the input shaft 11, $i_1$ is the transmission ratio of the input shaft 11 and the intermediate gear 13, $i_2$ is the transmission ratio of the intermediate gear 13 and the transmission shaft 14, $i_3$ is the transmission ratio of the variable displacement pump driving gear pair 24, $i_4$ is the transmission ratio of the front planetary gear outer ring gear 31 and the output end of the fixed displacement motor 22, $K_1$ is the characteristic parameter of the front planetary gear transmission assembly 3, $K_2$ is the characteristic parameter of the rear planetary gear transmission assembly 4, and e is the displacement ratio of the hydraulic transmission assembly 2.

Figure 6:
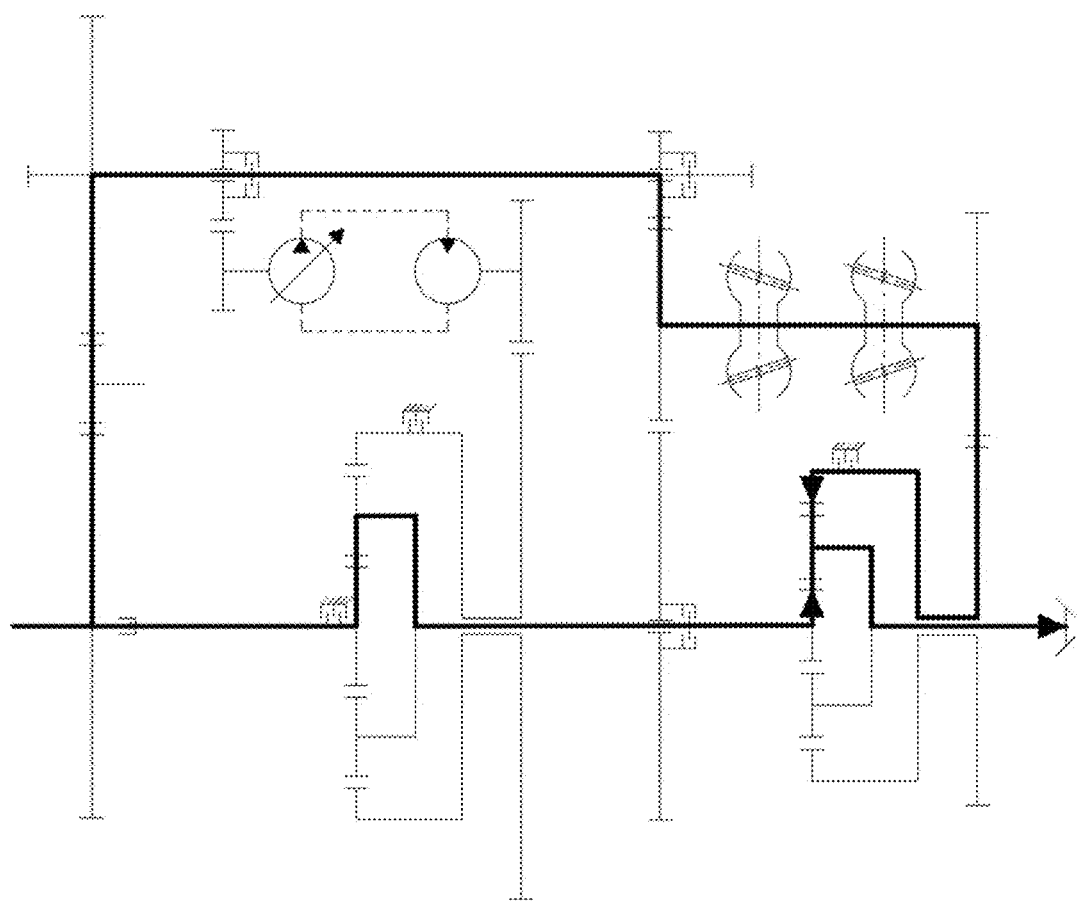
FIG. 6 is a schematic diagram showing the power flow in a mechanical constant-speed and mechanical variable-speed parallel hybrid transmission mode according to the present disclosure.

As shown in FIG. 6, the mechanical constant-speed and mechanical variable-speed parallel hybrid transmission mode is controlled by the following method:

The first clutch $L_1$ 12, the third clutch $L_3$ 64, and the second brake $B_2$ 35 are engaged while the second clutch $L_2$ 23, the fourth clutch $L_4$ 65, the first brake $B_1$ 44, and the third brake $B_3$ 34 are disengaged. Power passes through the input shaft assembly 1 and is split into two parts. One part of the power passes through the input shaft 11, the intermediate gear 13, the transmission shaft 14, the third clutch $L_3$ 64, the cup wheel and ring disc input shaft 62, the cup wheel and ring disc transmission mechanism 61, the cup wheel and ring disc output shaft 63, and the rear planetary gear outer ring gear 41 to the rear planetary gear planet carrier 42. The other part of the power is input from the input shaft 11, then sequentially passes through the first clutch $L_1$ 12, the front planetary gear sun gear 33, the front planetary gear planet carrier 32, and the rear planetary gear sun gear 43, and is converged at the rear planetary gear planet carrier 42 with the power passing through the mechanical continuously variable transmission 6. The power after convergence is output from the output shaft 5.

The transmission ratio $n_0/n_i$ in the mechanical constant-speed and mechanical variable-speed parallel hybrid transmission mode is:

$$\frac{i_1 i_2 i_5 i_s i_7 + K_2(1 + K_1)}{i_1 i_2 i_5 i_s i_7 (1 + K_1)(1 + K_2)}$$

where $n_0$ is the rotation speed of the output shaft 5, $n_i$ is the rotation speed of the input shaft 11, $i_1$ is the transmission ratio of the input shaft 11 and the intermediate gear 13, $i_2$ is the transmission ratio of the intermediate gear 13 and the transmission shaft 14, $i_5$ is the transmission ratio of the transmission shaft 14 and the cup wheel and ring disc input shaft 62, $i_8$ is the transmission ratio of the mechanical continuously variable transmission 6, $i_7$ is the transmission ratio of the cup wheel and ring disc output shaft 63 and the rear planetary gear outer ring gear 41, $K_1$ is the characteristic parameter of the front planetary gear transmission assembly 3, and $K_2$ is the characteristic parameter of the rear planetary gear transmission assembly 4.

Figure 7:
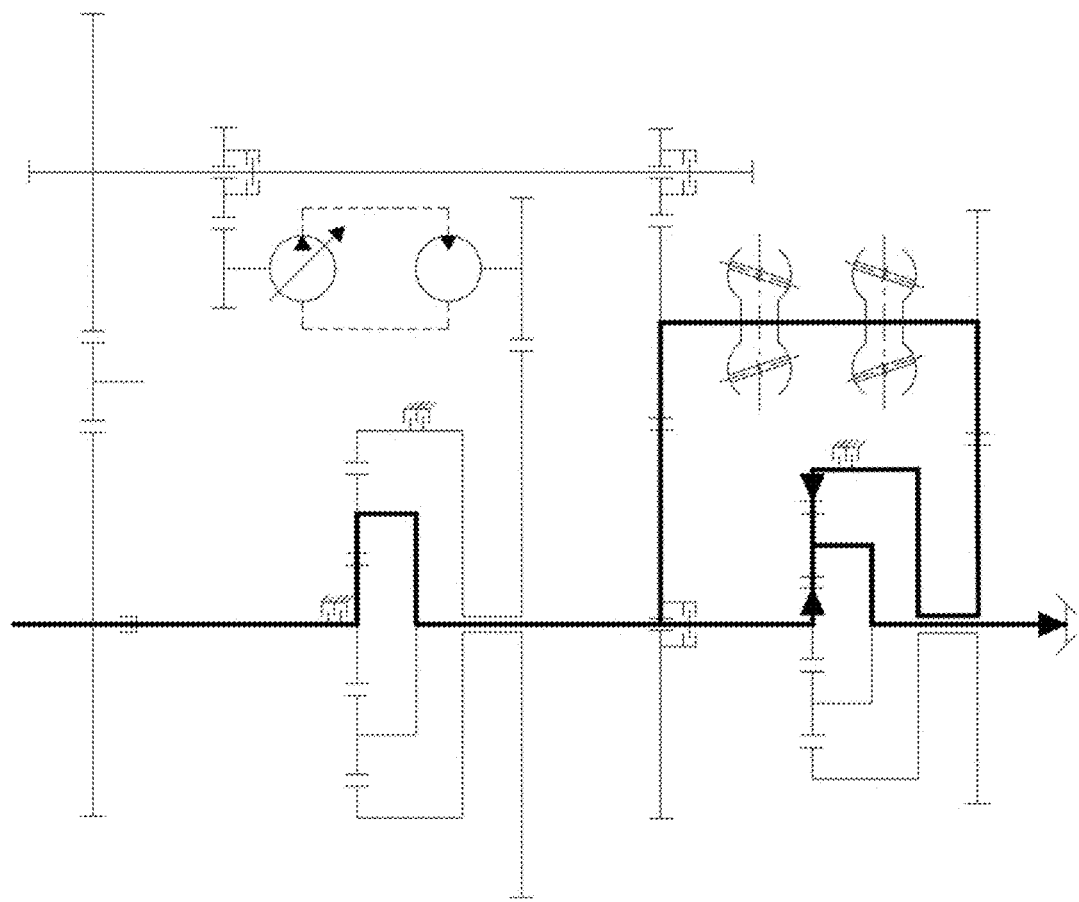
FIG. 7 is a schematic diagram showing the power flow in a mechanical constant-speed and mechanical variable-speed series hybrid transmission mode according to the present disclosure.

As shown in FIG. 7, the mechanical constant-speed and mechanical variable-speed series hybrid transmission mode is controlled by the following method:

The first clutch $L_1$ 12, the fourth clutch $L_4$ 65, and the second brake $B_2$ 35 are engaged while the second clutch $L_2$ 23, the third clutch $L_3$ 64, the first brake $B_1$ 44, and the third brake $B_3$ 34 are disengaged. Power passes through the input shaft 11, the first clutch $L_1$ 12, the front planetary gear sun gear 33, the front planetary gear planet carrier 32, and the rear planetary gear sun gear 43 to the rear planetary gear planet carrier 42. The power passing through the front planetary gear planet carrier 32 further sequentially passes through the fourth clutch $L_4$ 65, the cup wheel and ring disc input shaft 62, the cup wheel and ring disc transmission mechanism 61, the cup wheel and ring disc output shaft 63, and the rear planetary gear outer ring gear 41 to the rear planetary gear planet carrier 42. The power passing through the front planetary gear transmission assembly 3 and the power passing through the mechanical continuously variable transmission 6 are converged at the rear planetary gear planet carrier 42 and then output from the output shaft 5.

The transmission ratio $n_0/n_i$ in the mechanical constant-speed and mechanical variable-speed series hybrid transmission mode is:

$$\frac{1 + i_6 i_s i_7}{i_6 i_s i_7 (1 + K_1)(1 + K_2)}$$

where $n_0$ is the rotation speed of the output shaft 5, $n_i$ is the rotation speed of the input shaft 11, $i_6$ is a transmission ratio of the front planetary gear planet carrier 32 and the cup wheel and ring disc input shaft 62, $i_8$ is the transmission ratio of the mechanical continuously variable transmission 6, $i_7$ is the transmission ratio of the cup wheel and ring disc output shaft 63 and the rear planetary gear outer ring gear 41, $K_1$ is the characteristic parameter of the front planetary gear transmission assembly 3, and $K_2$ is the characteristic parameter of the rear planetary gear transmission assembly 4.

Figure 8:
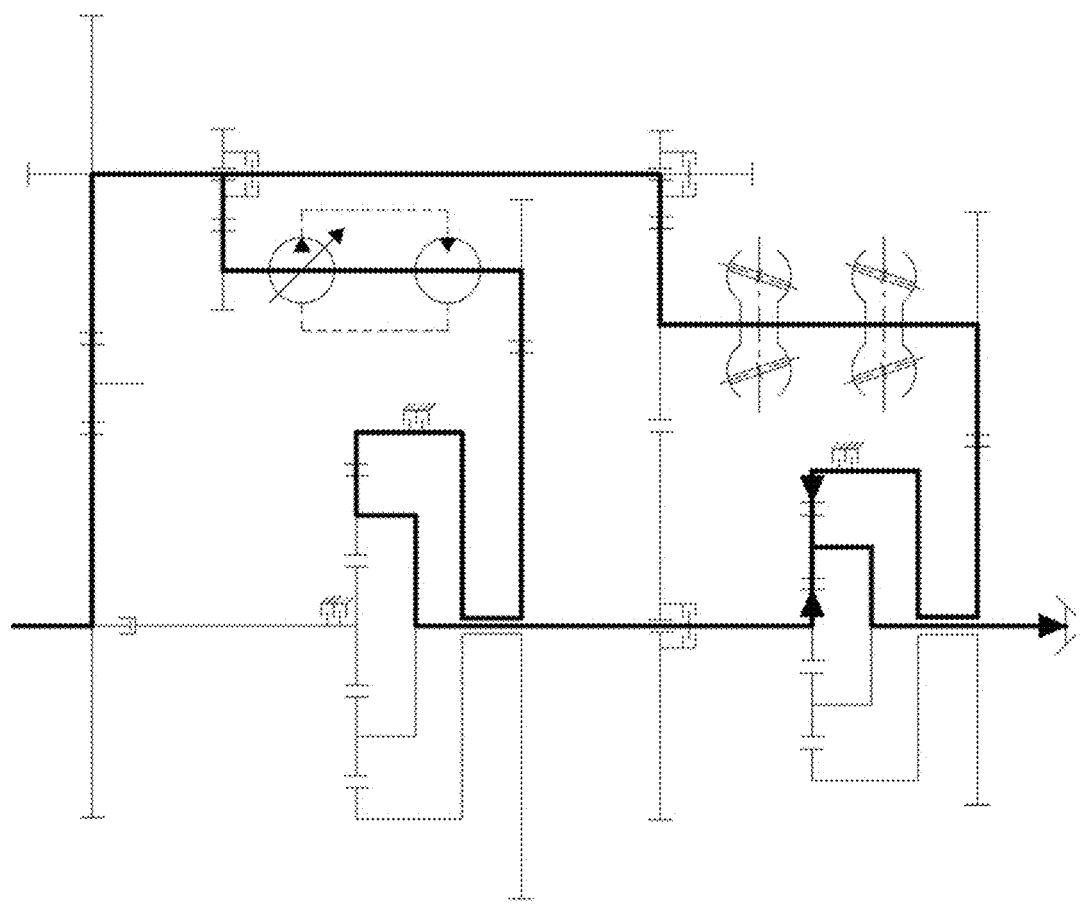
FIG. 8 is a schematic diagram showing the power flow in a hydraulic and mechanical variable-speed parallel hybrid transmission mode according to the present disclosure.

As shown in FIG. 8, the hydraulic and mechanical variable-speed parallel hybrid transmission mode is controlled by the following method:

The second clutch $L_2$ 23, the fourth clutch $L_4$ 65, and the third brake $B_3$ 34 are engaged while the first clutch $L_1$ 12, the third clutch $L_3$ 64, the first brake $B_1$ 44, and the second brake $B_2$ 35 are disengaged. Power passes through the input shaft 11, the intermediate gear 13, and the transmission shaft 14 and is split into two parts. One part of the power passes through the second clutch $L_2$ 23 and the variable displacement pump driving gear pair 24 to drive the variable displacement pump 21 to work. The variable displacement pump 21 outputs high-pressure oil to drive the fixed displacement motor 22 to rotate. The power output from the output shaft of the fixed displacement motor 22 passes through the front planetary gear outer ring gear 31, the front planetary gear planet carrier 32, and the rear planetary gear sun gear 43 to the rear planetary gear planet carrier 42. The other part of the power passes through the third clutch $L_3$ 64, the cup wheel and ring disc input shaft 62, the cup wheel and ring disc transmission mechanism 61, the cup wheel and ring disc output shaft 63, and the rear planetary gear outer ring gear 41 to the rear planetary gear planet carrier 42. The power passing through the hydraulic transmission assembly 2 and the power passing through the mechanical continuously variable transmission 6 are converged at the rear planetary gear planet carrier 42 and then output from the output shaft 5.

The transmission ratio $n_0/n_i$ in the hydraulic and mechanical variable-speed parallel hybrid transmission mode is:

$$\frac{eK_1(i_4 i_s i_7 + K_2)}{i_1 i_2 i_3 i_4 i_6 i_s i_7 (1 + K_1)(1 + K_2)}$$

where $n_0$ is the rotation speed of the output shaft 5, $n_i$ is the rotation speed of the input shaft 11, $i_1$ is the transmission ratio of the input shaft 11 and the intermediate gear 13, $i_2$ is the transmission ratio of the intermediate gear 13 and the transmission shaft 14, $i_3$ is the transmission ratio of the variable displacement pump driving gear pair 24, $i_4$ is the transmission ratio of the front planetary gear outer ring gear 31 and the output end of the fixed displacement motor 22, $i_6$ is the transmission ratio of the front planetary gear planet carrier 32 and the cup wheel and ring disc input shaft 62, $i_8$ is the transmission ratio of the mechanical continuously variable transmission 6, $i_7$ is the transmission ratio of the cup wheel and ring disc output shaft 63 and the rear planetary gear outer ring gear 41, $K_1$ is the characteristic parameter of the front planetary gear transmission assembly 3, $K_2$ is the characteristic parameter of the rear planetary gear transmission assembly 4, and e is the displacement ratio of the hydraulic transmission assembly 2.

Figure 9:
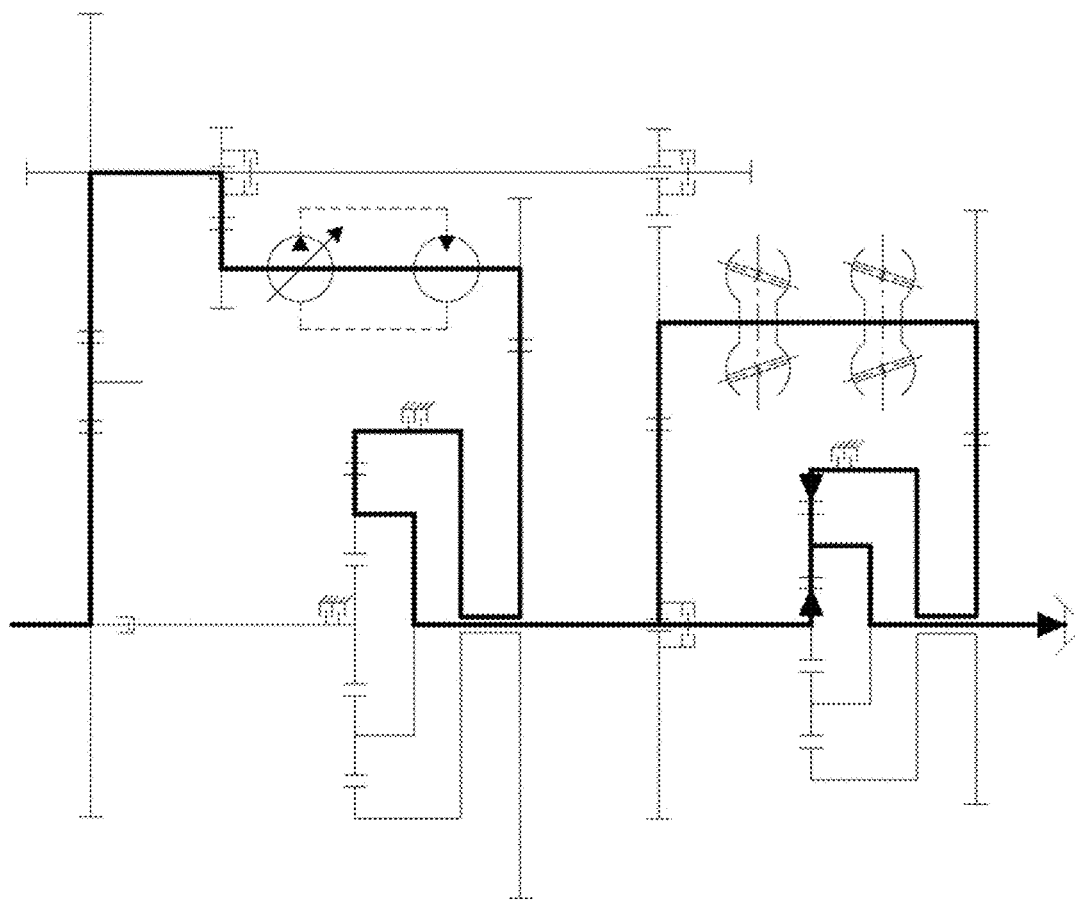
FIG. 9 is a schematic diagram showing the power flow in a hydraulic and mechanical variable-speed series hybrid transmission mode according to the present disclosure.
Figure 10:
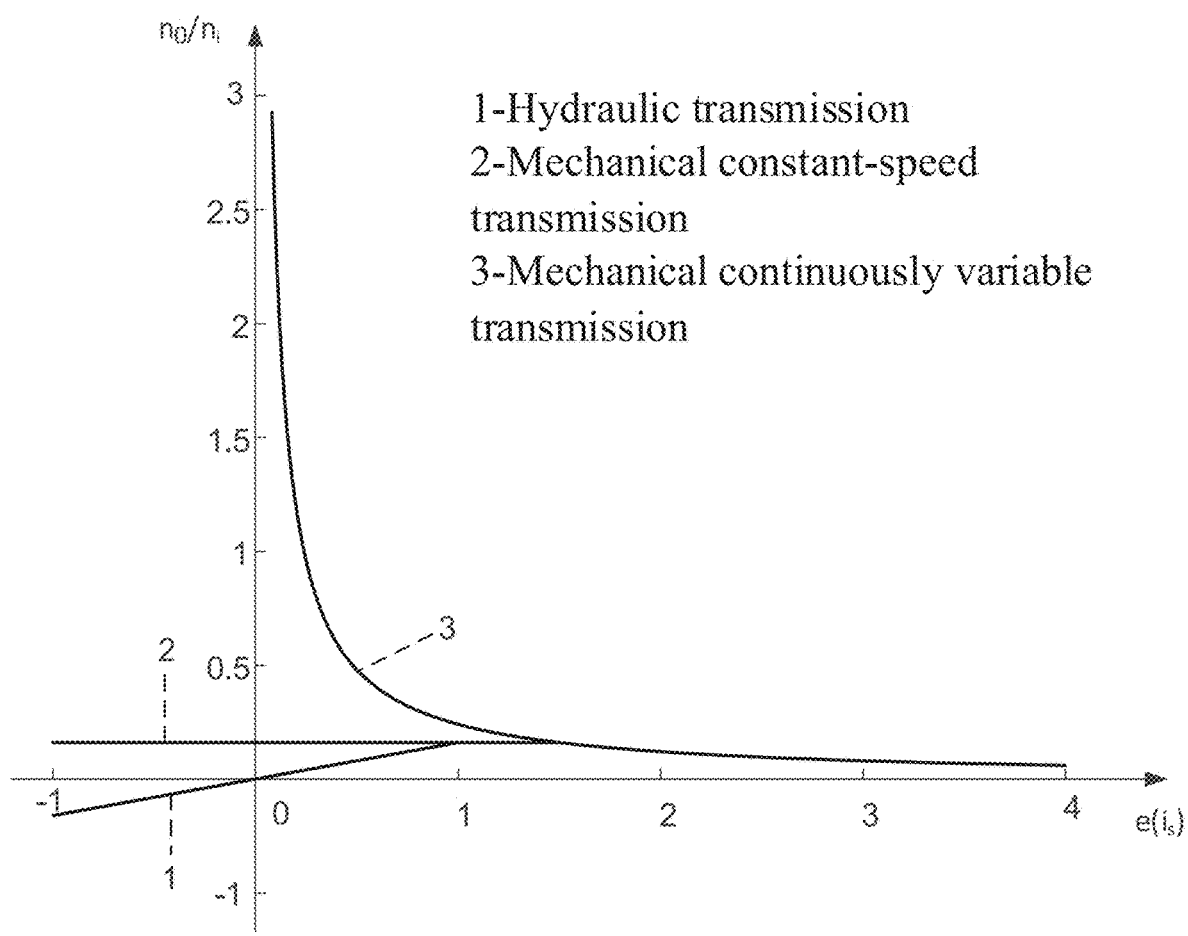
FIG. 10 shows characteristic curves of speed regulation in the single transmission modes according to the present disclosure.
Figure 11:
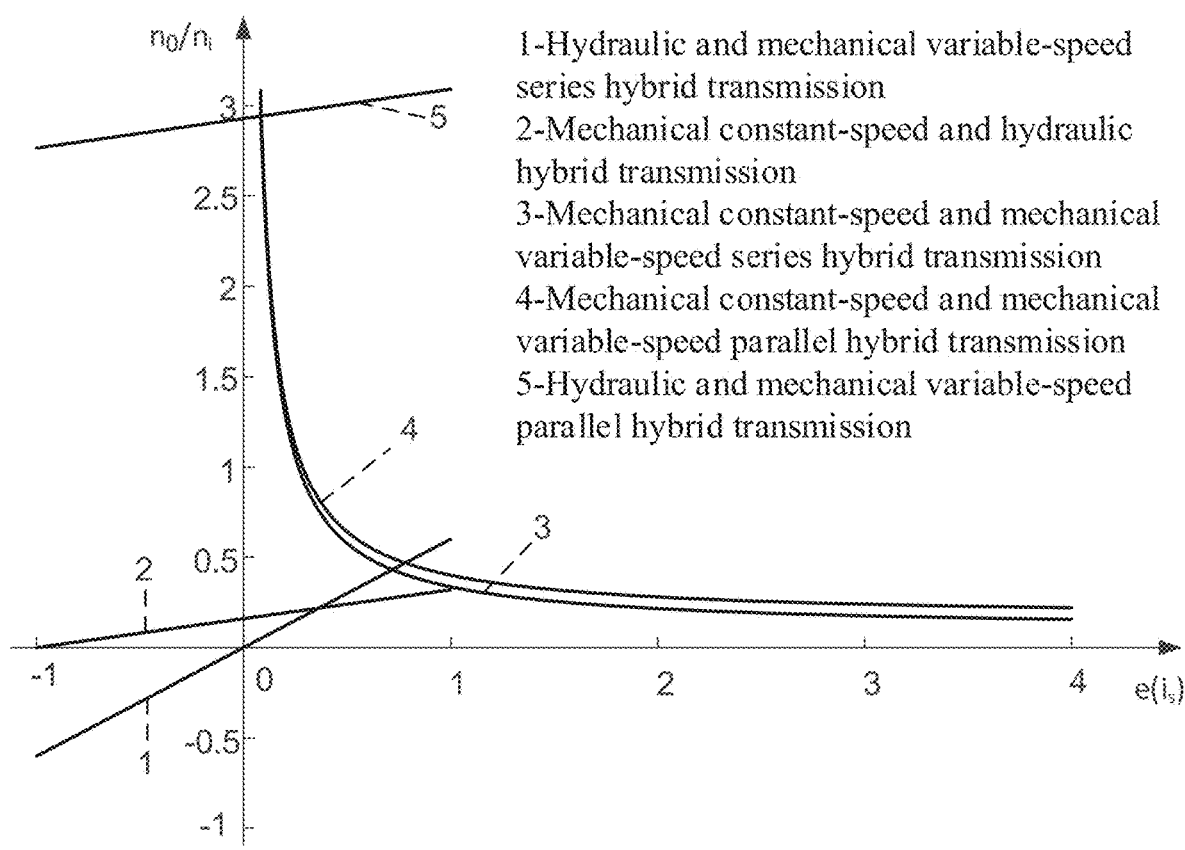
FIG. 11 shows characteristic curves of speed regulation in the hybrid transmission modes according to the present disclosure.

As shown in FIG. 9, the hydraulic and mechanical variable-speed series hybrid transmission mode is controlled by the following method:

The second clutch $L_2$ 23, the third clutch $L_3$ 64, and the third brake $B_3$ 34 are engaged while the first clutch $L_1$ 12, the fourth clutch $L_4$ 65, the first brake $B_1$ 44, and the second brake $B_2$ 35 are disengaged. Power passes through the input shaft 11, the intermediate gear 13, the transmission shaft 14, the second clutch $L_2$ 23, and the variable displacement pump driving gear pair 24 to drive the variable displacement pump 21 to work. The variable displacement pump 21 outputs high-pressure oil to drive the fixed displacement motor 22 to rotate. The power output from the output shaft of the fixed displacement motor 22 passes through the front planetary gear outer ring gear 31, the front planetary gear planet carrier 32, and the rear planetary gear sun gear 43 to the rear planetary gear planet carrier 42. The power passing through the front planetary gear planet carrier 32 further sequentially passes through the fourth clutch $L_4$ 65, the cup wheel and ring disc input shaft 62, the cup wheel and ring disc transmission mechanism 61, the cup wheel and ring disc output shaft 63, and the rear planetary gear outer ring gear 41 to the rear planetary gear planet carrier 42. The power passing through the hydraulic transmission assembly 2 and the power passing through the mechanical continuously variable transmission 6 are converged at the rear planetary gear planet carrier 42 and then output from the output shaft 5.

The transmission ratio $n_0/n_i$ in the hydraulic and mechanical variable-speed series hybrid transmission mode is:

$$\frac{ei_5 i_s i_7 K_1 + i_3 i_4 (1 + K_1) K_2}{i_1 i_2 i_3 i_4 i_5 i_s i_7 (1 + K_1)(1 + K_2)}$$

where $n_0$ is the rotation speed of the output shaft 5, $n_i$ is the rotation speed of the input shaft 11, $i_1$ is the transmission ratio of the input shaft 11 and the intermediate gear 13, $i_2$ is the transmission ratio of the intermediate gear 13 and the transmission shaft 14, $i_3$ is the transmission ratio of the variable displacement pump driving gear pair 24, $i_4$ is the transmission ratio of the front planetary gear outer ring gear 31 and the output end of the fixed displacement motor 22, $i_5$ is the transmission ratio of the transmission shaft 14 and the cup wheel and ring disc input shaft 62, $i_8$ is the transmission ratio of the mechanical continuously variable transmission 6, $i_7$ is the transmission ratio of the cup wheel and ring disc output shaft 63 and the rear planetary gear outer ring gear 41, $K_1$ is the characteristic parameter of the front planetary gear transmission assembly 3, $K_2$ is the characteristic parameter of the rear planetary gear transmission assembly 4, and e is the displacement ratio of the hydraulic transmission assembly 2.

All the embodiments in the specification are described in a progressive manner, each embodiment focuses on the differences from the other embodiments, and reference can be made to each other for the same or similar parts of the embodiments. Since the device disclosed herein corresponds to the method disclosed in the embodiments, the device is described simply and reference can be made to the description about the method for the related parts.

Persons skilled in the art can implement or use the present disclosure according to the description of the disclosed embodiments. It is apparent to persons skilled in the art that various modifications can be made to these embodiments, and general principles defined in this specification can be implemented in other embodiments without departing from the spirit or scope of the present disclosure. Therefore, the present disclosure is not limited by the embodiments described herein, but has the broadest scope conforming to the principles and innovative features disclosed by this specification.

What is claimed is:

1. A hybrid transmission device with a mechanical continuously variable transmission, comprising:

an input shaft assembly, wherein the input shaft assembly comprises an input shaft, a first clutch ($L_1$), an intermediate gear, and a transmission shaft;

a hydraulic transmission assembly, wherein the hydraulic transmission assembly comprises a variable displacement pump, a fixed displacement motor, a second clutch ($L_2$), and a variable displacement pump driving gear pair; the variable displacement pump is connected to the transmission shaft sequentially through the second clutch ($L_2$) and the variable displacement pump driving gear pair;

a front planetary gear transmission assembly, wherein the front planetary gear transmission assembly comprises a front planetary gear outer ring gear, a front planetary gear planet carrier, a front planetary gear sun gear, a third brake ($B_3$), and a second brake ($B_2$); the third brake ($B_3$) is connected to the front planetary gear sun gear, the input shaft is connected to the front planetary gear sun gear through the first clutch ($L_1$), the second brake ($B_2$) is connected to the front planetary gear outer ring gear, and the front planetary gear outer ring gear is gear-connected to an output end of the fixed displacement motor;

a rear planetary gear transmission assembly, wherein the rear planetary gear transmission assembly comprises a rear planetary gear outer ring gear, a rear planetary gear planet carrier, a rear planetary gear sun gear, and a first brake ($B_1$); the rear planetary gear sun gear is connected to the front planetary gear planet carrier, and the first brake ($B_1$) is connected to the rear planetary gear outer ring gear;

an output shaft, wherein the output shaft is connected to the rear planetary gear planet carrier;

a mechanical continuously variable transmission, wherein the mechanical continuously variable transmission comprises a cup wheel and ring disc transmission mechanism, a cup wheel and ring disc input shaft, and a cup wheel and ring disc output shaft; the cup wheel and ring disc input shaft is gear-connected to the transmission shaft and the front planetary gear planet carrier, a third clutch ($L_3$) is arranged between the cup wheel and ring disc input shaft and the transmission shaft, a fourth clutch ($L_4$) is arranged between the cup wheel and ring disc input shaft and the front planetary gear planet carrier, and the cup wheel and ring disc output shaft is gear-connected to the rear planetary gear outer ring gear, wherein single transmission modes and hybrid transmission modes are implemented through combination and engagement/disengagement of the brakes and the clutches, wherein the single transmission modes comprise a hydraulic transmission mode, a mechanical constant-speed transmission mode, and a mechanical continuously variable transmission mode; the hybrid transmission modes comprise a mechanical constant-speed and hydraulic hybrid transmission mode, mechanical constant-speed and mechanical variable-speed hybrid transmission modes, and hydraulic and mechanical variable-speed hybrid transmission modes, and wherein the single transmission modes are controlled by the following methods:
- in the hydraulic transmission mode, engaging the second clutch ($L_2$), the first brake ($B_1$), and the third brake ($B_3$) while disengaging the first clutch ($L_1$), the third clutch ($L_3$), the fourth clutch ($L_4$), and the second brake ($B_2$), so that power passes through the input shaft the intermediate gear, the transmission shaft, the second clutch ($L_2$), and the variable displacement pump driving gear pair to drive the variable displacement pump to work: the variable displacement pump outputs high-pressure oil to drive the fixed displacement motor to rotate: the power output from an output shaft of the fixed displacement motor passes through the front planetary gear outer ring gear, the front planetary gear planet carrier, the rear planetary gear sun gear, and the rear planetary gear planet carrier and is output from the output shaft;
- in the mechanical constant-speed transmission mode, engaging the first clutch ($L_1$) the first brake ($B_1$), and the second brake ($B_2$) while disengaging the second clutch ($L_2$), the third clutch ($L_3$) the fourth clutch ($L_4$), and the third brake ($B_3$), so that power is input from the input shaft, then sequentially passes through the first clutch ($L_1$), the front planetary gear sun gear, the front planetary gear planet carrier, the rear planetary gear sun gear, and the rear planetary gear planet carrier, and is output from the output shaft;
- in the mechanical continuously variable transmission mode, engaging the third clutch ($L_3$), the second brake ($B_2$), and the third brake ($B_3$) while disengaging the first clutch ($L_1$), the second clutch ($L_2$), the fourth clutch ($L_4$), and the first brake ($B_1$), so that power passes through the input shaft, the intermediate gear, the transmission shaft, the third clutch ($L_3$) the cup wheel and ring disc input shaft, the cup wheel and ring disc transmission mechanism, the cup wheel and ring disc output shaft, the rear planetary gear outer ring gear, and the rear planetary gear planet carrier and is output from the output shaft.

2. The hybrid transmission device with the mechanical continuously variable transmission according to claim 1, wherein the cup wheel and ring disc transmission mechanism comprises a front cup wheel and ring disc transmission mechanism and a rear cup wheel and ring disc transmission mechanism, wherein the front cup wheel and ring disc transmission mechanism and the rear cup wheel and ring disc transmission mechanism are connected in series.

3. The control method of the hybrid transmission device with the mechanical continuously variable transmission according to claim 1, wherein transmission ratios of the single transmission modes are calculated by the following methods:

the transmission ratio $n_o/n_i$ in the hydraulic transmission mode being:

$$\frac{eK_1}{i_1 i_2 i_3 i_4 (1+K_1)(1+K_2)}$$

wherein $n_0$ is a rotation speed of the output shaft, $n_i$ is a rotation speed of the input shaft, $i_1$ is a transmission ratio of the input shaft and the intermediate gear, $i_2$ is a transmission ratio of the intermediate gear and the transmission shaft, $i_3$ is a transmission ratio of the variable displacement pump driving gear pair, $i_4$ is a transmission ratio of the front planetary gear outer ring gear and the output end of the fixed displacement motor, $K_1$ is a planetary gear characteristic parameter of the front planetary gear transmission assembly, $K_2$ is a planetary gear characteristic parameter of the rear planetary gear transmission assembly, and e is a displacement ratio of the hydraulic transmission assembly;

the transmission ratio $n_o/n_i$ in the mechanical constant-speed mode being:

$$\frac{1}{(1+K_1)(1+K_2)}$$

wherein $n_0$ is the rotation speed of the output shaft, $n_i$ is the rotation speed of the input shaft, $K_1$ is the characteristic parameter of the front planetary gear transmission assembly, and $K_2$ is the characteristic parameter of the rear planetary gear transmission assembly;

the transmission ratio $n_o/n_i$ in the mechanical continuously variable transmission mode being:

$$\frac{K_2}{i_1 i_2 i_5 i_8 i_7 (1+K_2)}$$

wherein $n_0$ is the rotation speed of the output shaft, $n_i$ is the rotation speed of the input shaft, $i_1$ is the transmission ratio of the input shaft and the intermediate gear, $i_2$ is the transmission ratio of the intermediate gear and the transmission shaft, $i_5$ is a transmission ratio of the transmission shaft and the cup wheel and ring disc input shaft, $i_8$ is a transmission ratio of the mechanical continuously variable transmission, $i_7$ is a transmission ratio of the cup wheel and ring disc output shaft and the rear planetary gear outer ring gear, and $K_2$ is the characteristic parameter of the rear planetary gear transmission assembly.

4. A hybrid transmission device with a mechanical continuously variable transmission, comprising:
- an input shaft assembly, wherein the input shaft assembly comprises an input shaft, a first clutch ($L_1$), an intermediate gear, and a transmission shaft:
- a hydraulic transmission assembly, wherein the hydraulic transmission assembly comprises a variable displacement pump, a fixed displacement motor, a second clutch ($L_2$), and a variable displacement pump driving gear pair: the variable displacement pump is connected to the transmission shaft sequentially through the second clutch ($L_2$) and the variable displacement pump driving near pair;
- a front planetary gear transmission assembly, wherein the front planetary gear transmission assembly comprises a front planetary gear outer ring gear, a front planetary gear planet carrier, a front planetary gear sun gear, a third brake ($B_3$), and a second brake ($B_2$): the third brake ($B_3$) is connected to the front planetary gear sun gear, the input shaft is connected to the front planetary gear sun gear through the first clutch ($L_1$), the second brake ($B_2$) is connected to the front planetary gear outer ring gear, and the front planetary gear outer ring gear is gear-connected to an output end of the fixed displacement motor:

a rear planetary gear transmission assembly, wherein the rear planetary gear transmission assembly comprises a rear planetary gear outer ring gear, a rear planetary gear planet carrier, a rear planetary gear sun gear, and a first brake ($B_1$) the rear planetary near sun near is connected to the front planetary gear planet carrier, and the first brake ($B_1$) is connected to the rear planetary gear outer ring gear;

an output shaft, wherein the output shaft is connected to the rear planetary gear planet carrier;

a mechanical continuously variable transmission, wherein the mechanical continuously variable transmission comprises a cup wheel and ring disc transmission mechanism, a cup wheel and ring disc input shaft, and a cup wheel and ring disc output shaft: the cup wheel and ring disc input shaft is gear-connected to the transmission shaft and the front planetary gear planet carrier, a third clutch ($L_3$) is arranged between the cup wheel and ring disc input shaft and the transmission shaft, a fourth clutch ($L_4$) is arranged between the cup wheel and ring disc input shaft and the front planetary gear planet carrier, and the cup wheel and ring disc output shaft is gear-connected to the rear planetary gear outer ring gear, wherein single transmission modes and hybrid transmission modes are implemented through combination and engagement/disengagement of the brakes and the clutches, wherein the single transmission modes comprise a hydraulic transmission mode, a mechanical constant-speed transmission mode, and a mechanical continuously variable transmission mode; the hybrid transmission modes comprise a mechanical constant-speed and hydraulic hybrid transmission mode, mechanical constant-speed and mechanical variable-speed hybrid transmission modes, and hydraulic and mechanical variable-speed hybrid transmission modes, and wherein the hybrid transmission modes are controlled by the following methods:

in the mechanical constant-speed and hydraulic hybrid transmission mode, engaging the first clutch ($L_1$), the second clutch ($L_2$), and the first brake ($B_1$) while disengaging the third clutch ($L_3$), the fourth clutch ($L_4$), the second brake ($B_2$) and the third brake ($B_3$), so that power passes through the input shaft assembly and is split into two parts; one part of the power passes through the input shaft, the intermediate gear, the transmission shaft, the second clutch ($L_2$), and the variable displacement pump driving gear pair to drive the variable displacement pump to work; the variable displacement pump outputs high-pressure oil to drive the fixed displacement motor to rotate; the power output from the output shaft of the fixed displacement motor passes through the front planetary gear outer ring gear to the front planetary gear planet carrier; the other part of the power is input from the input shaft, then sequentially passes through the first clutch ($L_1$) and the front planetary gear sun gear to the front planetary gear planet carrier, and is converged with the power passing through the hydraulic transmission assembly; the power after convergence passes through the rear planetary gear sun gear and the rear planetary gear planet carrier and is output from the output shaft;

the mechanical constant-speed and mechanical variable-speed hybrid transmission modes comprise a mechanical constant-speed and mechanical variable-speed parallel hybrid transmission mode and a mechanical constant-speed and mechanical variable-speed series hybrid transmission mode, wherein in the mechanical constant-speed and mechanical variable-speed parallel hybrid transmission mode, power passes through the input shaft assembly and is split into two parts; the two parts of the power respectively pass through the front planetary gear transmission assembly and the mechanical continuously variable transmission connected in parallel and are converged at the rear planetary gear planet carrier of the rear planetary gear transmission assembly, and the power after convergence is output from the output shaft;

in the mechanical constant-speed and mechanical variable-speed series hybrid transmission mode, power sequentially passes through the front planetary gear transmission assembly and the mechanical continuously variable transmission and is converged at the rear planetary gear planet carrier, and the power after convergence is output from the output shaft;

the hydraulic and mechanical variable-speed hybrid transmission modes comprise a hydraulic and mechanical variable-speed parallel hybrid transmission mode and a hydraulic and mechanical variable-speed series hybrid transmission mode, wherein in the hydraulic and mechanical variable-speed parallel hybrid transmission mode, power passes through the input shaft, the intermediate gear, and the transmission shaft and is split into two parts; the two parts of the power respectively pass through the hydraulic transmission assembly and the mechanical continuously variable transmission connected in parallel and are converged at the rear planetary gear planet carrier of the rear planetary gear transmission assembly, and the power after convergence is output from the output shaft;

in the hydraulic and mechanical variable-speed series hybrid transmission mode, power sequentially passes through the hydraulic transmission assembly and the mechanical continuously variable transmission and is converged at the rear planetary gear planet carrier, and the power after convergence is output from the output shaft.

5. The control method of the hybrid transmission device with the mechanical continuously variable transmission according to claim 4, wherein the mechanical constant-speed and mechanical variable-speed parallel hybrid transmission mode is controlled by the following method:

engaging the first clutch ($L_1$), the third clutch ($L_3$), and the second brake ($B_2$) while disengaging the second clutch ($L_2$), the fourth clutch ($L_4$), the first brake ($B_1$), and the third brake ($B_3$), so that power passes through the input shaft assembly and is split into two parts, one part of the power passes through the input shaft, the intermediate gear, the transmission shaft, the third clutch ($L_3$), the cup wheel and ring disc input shaft, the cup wheel and ring disc transmission mechanism, the cup wheel and ring disc output shaft, and the rear planetary gear outer ring gear to the rear planetary gear planet carrier, the other part of the power is input from the input shaft, then sequentially passes through the first clutch ($L_1$), the front planetary gear sun gear, the front planetary gear planet carrier, and the rear planetary gear sun gear, and is converged at the rear planetary gear planet carrier with the power passing through the mechanical continuously variable transmission; and the power after convergence is output from the output shaft;

the mechanical constant-speed and mechanical variable-speed series hybrid transmission mode is controlled by the following method:

engaging the first clutch ($L_1$), the fourth clutch ($L_4$), and the second brake ($B_2$) while disengaging the second clutch ($L_2$), the third clutch ($L_3$), the first brake ($B_1$), and the third brake ($B_3$), so that power passes through the input shaft, the first clutch ($L_1$), the front planetary gear sun gear, the front planetary gear planet carrier, and the rear planetary gear sun gear to the rear planetary gear planet carrier; the power passing through the front planetary gear planet carrier further sequentially passes through the fourth clutch ($L_4$), the cup wheel and ring disc input shaft, the cup wheel and ring disc transmission mechanism, the cup wheel and ring disc output shaft, and the rear planetary gear outer ring gear to the rear planetary gear planet carrier; the power passing through the front planetary gear transmission assembly and the power passing through the mechanical continuously variable transmission are converged at the rear planetary gear planet carrier and then output from the output shaft.

6. The control method of the hybrid transmission device with the mechanical continuously variable transmission according to claim 4, wherein the hydraulic and mechanical variable-speed parallel hybrid transmission mode is controlled by the following method:

engaging the second clutch ($L_2$) the fourth clutch ($L_4$), and the third brake ($B_3$) while disengaging the first clutch ($L_1$), the third clutch ($L_3$), the first brake ($B_1$), and the second brake ($B_2$), so that power passes through the input shaft, the intermediate gear, and the transmission shaft and is split into two parts; one part of the power passes through the second clutch $L_2$) and the variable displacement pump driving gear pair to drive the variable displacement pump to work; the variable displacement pump outputs high-pressure oil to drive the fixed displacement motor to rotate; the power output from the output shaft of the fixed displacement motor passes through the front planetary gear outer ring gear, the front planetary gear planet carrier, and the rear planetary gear sun gear to the rear planetary gear planet carrier, the other part of the power passes through the third clutch ($L_3$), the cup wheel and ring disc input shaft, the cup wheel and ring disc transmission mechanism, the cup wheel and ring disc output shaft, and the rear planetary gear outer ring gear to the rear planetary gear planet carrier; the power passing through the hydraulic transmission assembly and the power passing through the mechanical continuously variable transmission are converged at the rear planetary gear planet carrier and then output from the output shaft;

the hydraulic and mechanical variable-speed series hybrid transmission mode is controlled by the following method:

engaging the second clutch ($L_2$), the third clutch ($L_3$), and the third brake ($B_3$) while disengaging the first clutch ($L_1$), the fourth clutch ($L_4$), the first brake ($B_1$), and the second brake ($B_2$), so that power passes through the input shaft, the intermediate gear, the transmission shaft, the second clutch ($L_2$), and the variable displacement pump driving gear pair to drive the variable displacement pump to work; the variable displacement pump outputs high-pressure oil to drive the fixed displacement motor to rotate; the power output from the output shaft of the fixed displacement motor passes through the front planetary gear outer ring gear, the front planetary gear planet carrier, and the rear planetary gear sun gear to the rear planetary gear planet carrier; the power passing through the front planetary gear planet carrier further sequentially passes through the fourth clutch ($L_4$), the cup wheel and ring disc input shaft, the cup wheel and ring disc transmission mechanism, the cup wheel and ring disc output shaft, and the rear planetary gear outer ring gear to the rear planetary gear planet carrier; the power passing through the hydraulic transmission assembly and the power passing through the mechanical continuously variable transmission are converged at the rear planetary gear planet carrier and then output from the output shaft.

7. The control method of the hybrid transmission device with the mechanical continuously variable transmission according to claim 4, wherein transmission ratios of the hybrid transmission modes are calculated by the following methods:

the transmission ratio $n_0/n_i$ in the mechanical constant-speed and hydraulic hybrid transmission mode being:

$$\frac{eK_1 + i_1 i_2 i_3 i_4}{i_1 i_2 i_3 i_4 (1+K_1)(1+K_2)}$$

wherein $n_0$ is a rotation speed of the output shaft, $n_i$ is a rotation speed of the input shaft, $i_1$ is a transmission ratio of the input shaft and the intermediate gear, $i_2$ is a transmission ratio of the intermediate gear and the transmission shaft, $i_3$ is a transmission ratio of the variable displacement pump driving gear pair, $i_4$ is a transmission ratio of the front planetary gear outer ring gear and the output end of the fixed displacement motor, $K_1$ is a characteristic parameter of the front planetary gear transmission assembly, $K_2$ is a characteristic parameter of the rear planetary gear transmission assembly, and e is a displacement ratio of the hydraulic transmission assembly;

the transmission ratio $n_0/n_i$ in the mechanical constant-speed and mechanical variable-speed parallel hybrid transmission mode being:

$$\frac{i_1 i_2 i_5 i_s i_7 + K_2(1+K_1)}{i_1 i_2 i_5 i_s i_7 (1+K_1)(1+K_2)}$$

wherein $n_0$ is the rotation speed of the output shaft, $n_i$ is the rotation speed of the input shaft, $i_1$ is the transmission ratio of the input shaft and the intermediate gear, $i_2$ is the transmission ratio of the intermediate gear and the transmission shaft, $i_5$ is a transmission ratio of the transmission shaft and the cup wheel and ring disc input shaft, $i_8$ is a transmission ratio of the mechanical continuously variable transmission, $i_7$ is a transmission ratio of the cup wheel and ring disc output shaft and the rear planetary gear outer ring gear, $K_1$ is the characteristic parameter of the front planetary gear transmission assembly, and $K_2$ is the characteristic parameter of the rear planetary gear transmission assembly;

the transmission ratio $n_0/n_i$ in the mechanical constant-speed and mechanical variable-speed series hybrid transmission mode being:

$$\frac{1 + i_6 i_s i_7}{i_6 i_s i_7 (1 + K_1)(1 + K_2)}$$

wherein $n_0$ is the rotation speed of the output shaft, $n_i$ is the rotation speed of the input shaft, $i_6$ is a transmission ratio of the front planetary gear planet carrier and the cup wheel and ring disc input shaft, $i_8$ is the transmission ratio of the mechanical continuously variable transmission, $i_7$ is the transmission ratio of the cup wheel and ring disc output shaft and the rear planetary gear outer ring gear, $K_1$ is the characteristic parameter of the front planetary gear transmission assembly, and $K_2$ is the characteristic parameter of the rear planetary gear transmission assembly;

the transmission ratio $n_0/n_i$ in the hydraulic and mechanical variable-speed parallel hybrid transmission mode being:

$$\frac{eK_1(i_4 i_s i_7 + K_2)}{i_1 i_2 i_3 i_4 i_6 i_s i_7 (1 + K_1)(1 + K_2)}$$

wherein $n_0$ is the rotation speed of the output shaft, $n_i$ is the rotation speed of the input shaft, $i_1$ is the transmission ratio of the input shaft and the intermediate gear, $i_2$ is the transmission ratio of the intermediate gear and the transmission shaft, $i_3$ is the transmission ratio of the variable displacement pump driving gear pair, $i_4$ is the transmission ratio of the front planetary gear outer ring gear and the output end of the fixed displacement motor, $i_6$ is the transmission ratio of the front planetary gear planet carrier and the cup wheel and ring disc input shaft, $i_8$ is the transmission ratio of the mechanical continuously variable transmission, $i_7$ is the transmission ratio of the cup wheel and ring disc output shaft and the rear planetary gear outer ring gear, $K_1$ is the characteristic parameter of the front planetary gear transmission assembly, $K_2$ is the characteristic parameter of the rear planetary gear transmission assembly, and e is the displacement ratio of the hydraulic transmission assembly;

the transmission ratio $n_0/n_i$ in the hydraulic and mechanical variable-speed series hybrid transmission mode being:

$$\frac{ei_5 i_s i_7 K_1 + i_3 i_4 (1 + K_1) K_2}{i_1 i_2 i_3 i_4 i_5 i_s i_7 (1 + K_1)(1 + K_2)}$$

wherein $n_0$ is the rotation speed of the output shaft, $n_i$ is the rotation speed of the input shaft, $i_1$ is the transmission ratio of the input shaft and the intermediate gear, $i_2$ is the transmission ratio of the intermediate gear and the transmission shaft, $i_3$ is the transmission ratio of the variable displacement pump driving gear pair, $i_4$ is the transmission ratio of the front planetary gear outer ring gear and the output end of the fixed displacement motor, $i_5$ is the transmission ratio of the transmission shaft and the cup wheel and ring disc input shaft, $i_8$ is the transmission ratio of the mechanical continuously variable transmission, $i_7$ is the transmission ratio of the cup wheel and ring disc output shaft and the rear planetary gear outer ring gear, $K_1$ is the characteristic parameter of the front planetary gear transmission assembly, $K_2$ is the characteristic parameter of the rear planetary gear transmission assembly, and e is the displacement ratio of the hydraulic transmission assembly.

8. A hybrid transmission device with a mechanical continuously variable transmission, comprising:
an input shaft assembly, wherein the input shaft assembly comprises an input shaft, a first clutch ($L_1$), an intermediate gear, and a transmission shaft;
a hydraulic transmission assembly, wherein the hydraulic transmission assembly comprises a variable displacement pump, a fixed displacement motor, a second clutch ($L_2$) and a variable displacement pump driving gear pair; the variable displacement pump is connected to the transmission shaft sequentially through the second clutch ($L_2$) and the variable displacement pump driving gear pair;
a front planetary gear transmission assembly, wherein the front planetary gear transmission assembly comprises a front planetary gear outer ring gear, a front planetary gear planet carrier, a front planetary near sun gear, a third brake ($B_3$) and a second brake ($B_2$); the third brake ($B_3$) is connected to the front planetary gear sun gear, the input shaft is connected to the front planetary gear sun gear through the first clutch ($L_1$), the second brake ($B_2$) is connected to the front planetary gear outer ring gear, and the front planetary gear outer ring gear is gear-connected to an output end of the fixed displacement motor;
a rear planetary gear transmission assembly, wherein the rear planetary gear transmission assembly comprises a rear planetary gear outer ring gear, a rear planetary gear planet carrier, a rear planetary gear sun gear, and a first brake ($B_1$); the rear planetary gear sun gear is connected to the front planetary gear planet carrier, and the first brake ($B_1$) is connected to the rear planetary gear outer ring gear;
an output shaft, wherein the output shaft is connected to the rear planetary gear planet carrier;
a mechanical continuously variable transmission, wherein the mechanical continuously variable transmission comprises a cup wheel and ring disc transmission mechanism, a cup wheel and ring disc input shaft, and a cup wheel and ring disc output shaft the cup wheel and ring disc input shaft is gear-connected to the transmission shaft and the front planetary gear planet carrier, a third clutch ($L_3$) is arranged between the cup wheel and ring disc input shaft and the transmission shaft, a fourth clutch ($L_4$) is arranged between the cup wheel and ring disc input shaft and the front planetary gear planet carrier, and the cup wheel and ring disc output shaft is gear-connected to the rear planetary gear outer ring gear,
wherein the cup wheel and ring disc transmission mechanism comprises a front cup wheel and ring disc transmission mechanism and a rear cup wheel and ring disc transmission mechanism, wherein the front cup wheel and ring disc transmission mechanism and the rear cup wheel and ring disc transmission mechanism are connected in series,
wherein single transmission modes and hybrid transmission modes are implemented through combination and engagement/disengagement of the brakes and the clutches, wherein the single transmission modes comprise a hydraulic transmission mode, a mechanical constant-speed transmission mode, and a mechanical continuously variable transmission mode; the hybrid transmission modes comprise a mechanical constant-speed and hydraulic hybrid transmission mode, mechanical constant-speed and mechanical variable-speed hybrid transmission modes, and hydraulic and mechanical variable-speed hybrid transmission modes, and wherein the single transmission modes are controlled by the following methods:

in the hydraulic transmission mode, engaging the second clutch ($L_2$), the first brake ($B_1$), and the third brake ($B_3$) while disengaging the first clutch ($L_1$), the third clutch ($L_3$), the fourth clutch ($L_4$), and the second brake ($B_2$), so that power passes through the input shaft, the intermediate gear, the transmission shaft, the second clutch ($L_2$), and the variable displacement pump driving gear pair to drive the variable displacement pump to work: the variable displacement pump outputs high-pressure oil to drive the fixed displacement motor to rotate: the power output from an output shaft of the fixed displacement motor passes through the front planetary gear outer ring gear, the front planetary gear planet carrier, the rear planetary gear sun gear, and the rear planetary gear planet carrier and is output from the output shaft;

in the mechanical constant-speed transmission mode, engaging the first clutch ($L_1$), the first brake ($B_1$), and the second brake ($B_2$) while disengaging the second clutch ($L_2$), the third clutch ($L_3$), the fourth clutch ($L_4$), and the third brake ($B_3$), so that power is input from the input shaft, then sequentially passes through the first clutch ($L_1$), the front planetary gear sun gear, the front planetary gear planet carrier, the rear planetary gear sun gear, and the rear planetary gear planet carrier, and is output from the output shaft;

in the mechanical continuously variable transmission mode, engaging the third clutch ($L_3$), the second brake ($B_2$), and the third brake ($B_3$) while disengaging the first clutch ($L_1$), the second clutch ($L_2$), the fourth clutch ($L_2$) and the first brake ($B_1$), so that power passes through the input shaft, the intermediate gear, the transmission shaft, the third clutch ($L_3$), the cup wheel and ring disc input shaft, the cup wheel and ring disc transmission mechanism, the cup wheel and ring disc output shaft, the rear planetary gear outer ring gear, and the rear planetary gear planet carrier and is output from the output shaft.

9. The control method of the hybrid transmission device with the mechanical continuously variable transmission according to claim 8, wherein the hybrid transmission modes are controlled by the following methods:

in the mechanical constant-speed and hydraulic hybrid transmission mode, engaging the first clutch ($L_1$), the second clutch ($L_2$), and the first brake ($B_1$) while disengaging the third clutch ($L_3$), the fourth clutch ($L_4$), the second brake ($B_2$), and the third brake ($B_3$), so that power passes through the input shaft assembly and is split into two parts; one part of the power passes through the input shaft, the intermediate gear, the transmission shaft, the second clutch ($L_2$), and the variable displacement pump driving gear pair to drive the variable displacement pump to work; the variable displacement pump outputs high-pressure oil to drive the fixed displacement motor to rotate; the power output from the output shaft of the fixed displacement motor passes through the front planetary gear outer ring gear to the front planetary gear planet carrier; the other part of the power is input from the input shaft, then sequentially passes through the first clutch ($L_1$) and the front planetary gear sun gear to the front planetary gear planet carrier, and is converged with the power passing through the hydraulic transmission assembly; the power after convergence passes through the rear planetary gear sun gear and the rear planetary gear planet carrier and is output from the output shaft;

the mechanical constant-speed and mechanical variable-speed hybrid transmission modes comprise a mechanical constant-speed and mechanical variable-speed parallel hybrid transmission mode and a mechanical constant-speed and mechanical variable-speed series hybrid transmission mode, wherein in the mechanical constant-speed and mechanical variable-speed parallel hybrid transmission mode, power passes through the input shaft assembly and is split into two parts; the two parts of the power respectively pass through the front planetary gear transmission assembly and the mechanical continuously variable transmission connected in parallel and are converged at the rear planetary gear planet carrier of the rear planetary gear transmission assembly, and the power after convergence is output from the output shaft;

in the mechanical constant-speed and mechanical variable-speed series hybrid transmission mode, power sequentially passes through the front planetary gear transmission assembly and the mechanical continuously variable transmission and is converged at the rear planetary gear planet carrier, and the power after convergence is output from the output shaft;

the hydraulic and mechanical variable-speed hybrid transmission modes comprise a hydraulic and mechanical variable-speed parallel hybrid transmission mode and a hydraulic and mechanical variable-speed series hybrid transmission mode, wherein in the hydraulic and mechanical variable-speed parallel hybrid transmission mode, power passes through the input shaft, the intermediate gear, and the transmission shaft and is split into two parts, the two parts of the power respectively pass through the hydraulic transmission assembly and the mechanical continuously variable transmission connected in parallel and are converged at the rear planetary gear planet carrier of the rear planetary gear transmission assembly, and the power after convergence is output from the output shaft;

in the hydraulic and mechanical variable-speed series hybrid transmission mode, power sequentially passes through the hydraulic transmission assembly and the mechanical continuously variable transmission and is converged at the rear planetary gear planet carrier, and the power after convergence is output from the output shaft.

10. The control method of the hybrid transmission device with the mechanical continuously variable transmission according to claim 9, wherein the mechanical constant-speed and mechanical variable-speed parallel hybrid transmission mode is controlled by the following method:

engaging the first clutch ($L_1$), the third clutch ($L_3$), and the second brake ($B_2$) while disengaging the second clutch ($L_2$), the fourth clutch ($L_4$), the first brake ($B_1$), and the third brake ($B_3$), so that power passes through the input shaft assembly and is split into two parts; one part of the power passes through the input shaft, the intermediate gear, the transmission shaft, the third clutch ($L_3$), the cup wheel and ring disc input shaft, the cup wheel and ring disc transmission mechanism, the cup wheel and ring disc output shaft, and the rear planetary gear outer ring gear to the rear planetary gear planet carrier; the other part of the power is input from the input shaft, then sequentially passes through the first clutch ($L_1$), the front planetary gear sun gear, the front planetary gear planet carrier, and the rear planetary gear sun gear, and is converged at the rear planetary gear planet carrier with the power passing through the mechanical continuously variable transmission; and the power after convergence is output from the output shaft;

the mechanical constant-speed and mechanical variable-speed series hybrid transmission mode is controlled by the following method:

engaging the first clutch ($L_1$), the fourth clutch ($L_4$), and the second brake ($B_2$) while disengaging the second clutch ($L_2$), the third clutch ($L_3$), the first brake ($B_1$), and the third brake ($B_3$), so that power passes through the input shaft, the first clutch ($L_1$), the front planetary gear sun gear, the front planetary gear planet carrier, and the rear planetary gear sun gear to the rear planetary gear planet carrier; the power passing through the front planetary gear planet carrier further sequentially passes through the fourth clutch ($L_4$), the cup wheel and ring disc input shaft, the cup wheel and ring disc transmission mechanism, the cup wheel and ring disc output shaft, and the rear planetary gear outer ring gear to the rear planetary gear planet carrier; the power passing through the front planetary gear transmission assembly and the power passing through the mechanical continuously variable transmission are converged at the rear planetary gear planet carrier and then output from the output shaft.

11. The control method of the hybrid transmission device with the mechanical continuously variable transmission according to claim 9, wherein the hydraulic and mechanical variable-speed parallel hybrid transmission mode is controlled by the following method:

engaging the second clutch ($L_2$), the fourth clutch ($L_4$) and the third brake ($B_3$) while disengaging the first clutch ($L_1$) the third clutch ($L_3$), the first brake ($B_1$), and the second brake ($B_2$), so that power passes through the input shaft, the intermediate gear, and the transmission shaft and is split into two parts; one part of the power passes through the second clutch ($L_2$) and the variable displacement pump driving gear pair to drive the variable displacement pump to work; the variable displacement pump outputs high-pressure oil to drive the fixed displacement motor to rotate; the power output from the output shaft of the fixed displacement motor passes through the front planetary gear outer ring gear, the front planetary gear planet carrier, and the rear planetary gear sun gear to the rear planetary gear planet carrier, the other part of the power passes through the third clutch ($L_3$), the cup wheel and ring disc input shaft, the cup wheel and ring disc transmission mechanism, the cup wheel and ring disc output shaft, and the rear planetary gear outer ring gear to the rear planetary gear planet carrier; the power passing through the hydraulic transmission assembly and the power passing through the mechanical continuously variable transmission are converged at the rear planetary gear planet carrier and then output from the output shaft;

the hydraulic and mechanical variable-speed series hybrid transmission mode is controlled by the following method:

engaging the second clutch ($L_2$), the third clutch ($L_3$), and the third brake ($B_3$) while disengaging the first clutch ($L_1$), the fourth clutch ($L_4$), the first brake ($B_1$), and the second brake ($B_2$), so that power passes through the input shaft, the intermediate gear, the transmission shaft, the second clutch ($L_2$), and the variable displacement pump driving gear pair to drive the variable displacement pump to work; the variable displacement pump outputs high-pressure oil to drive the fixed displacement motor to rotate; the power output from the output shaft of the fixed displacement motor passes through the front planetary gear outer ring gear, the front planetary gear planet carrier, and the rear planetary gear sun gear to the rear planetary gear planet carrier; the power passing through the front planetary gear planet carrier further sequentially passes through the fourth clutch ($L_4$), the cup wheel and ring disc input shaft, the cup wheel and ring disc transmission mechanism, the cup wheel and ring disc output shaft, and the rear planetary gear outer ring gear to the rear planetary gear planet carrier; the power passing through the hydraulic transmission assembly and the power passing through the mechanical continuously variable transmission are converged at the rear planetary gear planet carrier and then output from the output shaft.

12. The control method of the hybrid transmission device with the mechanical continuously variable transmission according to claim 9, wherein transmission ratios of the hybrid transmission modes are calculated by the following methods: the transmission ratio $n_0/n_i$ in the mechanical constant-speed and hydraulic hybrid transmission mode being:

$$\frac{eK_1 + i_1 i_2 i_3 i_4}{i_1 i_2 i_3 i_4 (1+K_1)(1+K_2)}$$

wherein $n_0$ is a rotation speed of the output shaft, $n_i$ is a rotation speed of the input shaft, $i_1$ is a transmission ratio of the input shaft and the intermediate gear, $i_2$ is a transmission ratio of the intermediate gear and the transmission shaft, $i_5$ is a transmission ratio of the variable displacement pump driving gear pair, $i_4$ is a transmission ratio of the front planetary gear outer ring gear and the output end of the fixed displacement motor, $K_1$ is a characteristic parameter of the front planetary gear transmission assembly, $K_2$ is a characteristic parameter of the rear planetary gear transmission assembly, and e is a displacement ratio of the hydraulic transmission assembly;

the transmission ratio $n_0/n_i$ in the mechanical constant-speed and mechanical variable-speed parallel hybrid transmission mode being:

$$\frac{i_1 i_2 i_5 i_s i_7 + K_2(1+K_1)}{i_1 i_2 i_5 i_s i_7 (1+K_1)(1+K_2)}$$

wherein $n_0$ is the rotation speed of the output shaft, $n_i$ is the rotation speed of the input shaft, $i_1$ is the transmission ratio of the input shaft and the intermediate gear, $i_2$ is the transmission ratio of the intermediate gear and the transmission shaft, $i_5$ is a transmission ratio of the transmission shaft and the cup wheel and ring disc input shaft, $i_8$ is a transmission ratio of the mechanical continuously variable transmission, $i_7$ is a transmission ratio of the cup wheel and ring disc output shaft and the rear planetary gear outer ring gear, $K_1$ is the characteristic parameter of the front planetary gear transmission assembly, and $K_2$ is the characteristic parameter of the rear planetary gear transmission assembly;

the transmission ratio $n_0/n_i$ in the mechanical constant-speed and mechanical variable-speed series hybrid transmission mode being:

$$\frac{1 + i_6 i_s i_7}{i_6 i_s i_7 (1 + K_1)(1 + K_2)}$$

wherein $n_0$ is the rotation speed of the output shaft, $n_i$ is the rotation speed of the input shaft, $i_6$ is a transmission ratio of the front planetary gear planet carrier and the cup wheel and ring disc input shaft, $i_8$ is the transmission ratio of the mechanical continuously variable transmission, $i_7$ is the transmission ratio of the cup wheel and ring disc output shaft and the rear planetary gear outer ring gear, $K_1$ is the characteristic parameter of the front planetary gear transmission assembly, and $K_2$ is the characteristic parameter of the rear planetary gear transmission assembly;

the transmission ratio $n_0/n_i$ in the hydraulic and mechanical variable-speed parallel hybrid transmission mode being:

$$\frac{eK_1(i_4 i_s i_7 + K_2)}{i_1 i_2 i_3 i_4 i_6 i_s i_7 (1 + K_1)(1 + K_2)}$$

wherein $n_0$ is the rotation speed of the output shaft, $n_i$ is the rotation speed of the input shaft, $i_1$ is the transmission ratio of the input shaft and the intermediate gear, $i_2$ is the transmission ratio of the intermediate gear and the transmission shaft, $i_3$ is the transmission ratio of the variable displacement pump driving gear pair, $i_4$ is the transmission ratio of the front planetary gear outer ring gear and the output end of the fixed displacement motor, $i_6$ is the transmission ratio of the front planetary gear planet carrier and the cup wheel and ring disc input shaft, $i_8$ is the transmission ratio of the mechanical continuously variable transmission, $i_7$ is the transmission ratio of the cup wheel and ring disc output shaft and the rear planetary gear outer ring gear, $K_1$ is the characteristic parameter of the front planetary gear transmission assembly, $K_2$ is the characteristic parameter of the rear planetary gear transmission assembly, and e is the displacement ratio of the hydraulic transmission assembly;

the transmission ratio $n_0/n_i$ in the hydraulic and mechanical variable-speed series hybrid transmission mode being:

$$\frac{e i_5 i_s i_7 K_1 + i_3 i_4 (1 + K_1) K_2}{i_1 i_2 i_3 i_4 i_5 i_s i_7 (1 + K_1)(1 + K_2)}$$

wherein $n_0$ is the rotation speed of the output shaft, $n_i$ is the rotation speed of the input shaft, $i_1$ is the transmission ratio of the input shaft and the intermediate gear, $i_2$ is the transmission ratio of the intermediate gear and the transmission shaft, $i_3$ is the transmission ratio of the variable displacement pump driving gear pair, $i_4$ is the transmission ratio of the front planetary gear outer ring gear and the output end of the fixed displacement motor, $i_5$ is the transmission ratio of the transmission shaft and the cup wheel and ring disc input shaft, $i_8$ is the transmission ratio of the mechanical continuously variable transmission, $i_7$ is the transmission ratio of the cup wheel and ring disc output shaft and the rear planetary gear outer ring gear, $K_1$ is the characteristic parameter of the front planetary gear transmission assembly, $K_2$ is the characteristic parameter of the rear planetary gear transmission assembly, and e is the displacement ratio of the hydraulic transmission assembly.

13. The control method of the hybrid transmission device with the mechanical continuously variable transmission according to claim 8, wherein transmission ratios of the single transmission modes are calculated by the following methods:

the transmission ratio $n_0/n_i$ in the hydraulic transmission mode being:

$$\frac{eK_1}{i_1 i_2 i_3 i_4 (1 + K_1)(1 + K_2)}$$

wherein $n_0$ is a rotation speed of the output shaft, $n_i$ is a rotation speed of the input shaft, $i_1$ is a transmission ratio of the input shaft and the intermediate gear, $i_2$ is a transmission ratio of the intermediate gear and the transmission shaft, $i_3$ is a transmission ratio of the variable displacement pump driving gear pair, $i_4$ is a transmission ratio of the front planetary gear outer ring gear and the output end of the fixed displacement motor, $K_1$ is a planetary gear characteristic parameter of the front planetary gear transmission assembly, $K_2$ is a planetary gear characteristic parameter of the rear planetary gear transmission assembly, and e is a displacement ratio of the hydraulic transmission assembly;

the transmission ratio $n_0/n_i$ in the mechanical constant-speed mode being:

$$\frac{1}{(1 + K_1)(1 + K_2)}$$

wherein $n_0$ is the rotation speed of the output shaft, $n_i$ is the rotation speed of the input shaft, $K_1$ is the characteristic parameter of the front planetary gear transmission assembly, and $K_2$ is the characteristic parameter of the rear planetary gear transmission assembly;

the transmission ratio $n_0/n_i$ in the mechanical continuously variable transmission mode being:

$$\frac{K_2}{i_1 i_2 i_5 i_s i_7 (1 + K_2)}$$

wherein $n_0$ is the rotation speed of the output shaft, $n_i$ is the rotation speed of the input shaft, $i_1$ is the transmission ratio of the input shaft and the intermediate gear, $i_2$ is the transmission ratio of the intermediate gear and the transmission shaft, $i_5$ is a transmission ratio of the transmission shaft and the cup wheel and ring disc input shaft, $i_8$ is a transmission ratio of the mechanical continuously variable transmission, $i_7$ is a transmission ratio of the cup wheel and ring disc output shaft and the rear planetary gear outer ring gear, and $K_2$ is the characteristic parameter of the rear planetary gear transmission assembly.

* * * * *